United States Patent
Al-Jawhari et al.

(10) Patent No.: US 11,376,570 B1
(45) Date of Patent: Jul. 5, 2022

(54) METHOD OF FORMING COPPER OXIDE-ON-COPPER NANOMATERIAL CATALYST MESH

(71) Applicant: King Abdulaziz University, Jeddah (SA)

(72) Inventors: Hala Al-Jawhari, Jeddah (SA); Nuha Alhebshi, Jeddah (SA)

(73) Assignee: King Abdulaziz University, Jeddah (SA)

(*) Notice: Subject to any disclaimer, the term of this patent is extended or adjusted under 35 U.S.C. 154(b) by 0 days.

(21) Appl. No.: 17/381,266

(22) Filed: Jul. 21, 2021

(51) Int. Cl.
| | |
|---|---|
| *B01J 23/72* | (2006.01) |
| *B01J 35/00* | (2006.01) |
| *B01J 35/02* | (2006.01) |
| *B01J 35/04* | (2006.01) |
| *B01J 37/08* | (2006.01) |
| *B01D 11/02* | (2006.01) |

(52) U.S. Cl.
CPC ........... *B01J 23/72* (2013.01); *B01D 11/0288* (2013.01); *B01D 11/0292* (2013.01); *B01J 35/008* (2013.01); *B01J 35/0086* (2013.01); *B01J 35/023* (2013.01); *B01J 35/04* (2013.01); *B01J 37/08* (2013.01)

(58) Field of Classification Search
CPC ...... B01J 23/72; B01J 35/008; B01J 35/0086; B01J 35/023; B01J 35/04; B01J 37/08; B01D 11/0288; B01D 11/0292
USPC ....................................................... 502/346
See application file for complete search history.

(56) References Cited

U.S. PATENT DOCUMENTS

| | | | |
|---|---|---|---|
| 8,057,682 B2 | 11/2011 | Hoag et al. | |
| 8,877,676 B2* | 11/2014 | Park .................. | C07D 249/04 |
| | | | 502/346 |
| 9,518,012 B2* | 12/2016 | Park .................... | B01J 37/0211 |
| 10,329,677 B2* | 6/2019 | Geioushy ................ | C25B 3/25 |
| 10,913,056 B2 | 2/2021 | Chen et al. | |
| 2009/0098033 A1* | 4/2009 | Lian ....................... | C09C 1/627 |
| | | | 423/213.5 |

(Continued)

FOREIGN PATENT DOCUMENTS

| | | |
|---|---|---|
| CN | 106498430 A | 3/2017 |
| CN | 109568578 A | 4/2019 |

(Continued)

OTHER PUBLICATIONS

Khatani, et al.; Copper/copper oxide nanoparticles synthesis using Stachys lavandulifolia and its antibacterial activity; IET Nanobiotechnology; Mar. 22, 2017; 5 Pages.

(Continued)

*Primary Examiner* — Cam N. Nguyen
(74) *Attorney, Agent, or Firm* — Oblon, McClelland, Maier & Neustadt, L.L.P.

(57) ABSTRACT

A method of forming a nanomaterial catalyst mesh and a nanomaterial catalyst mesh formed by the method. The nanomaterial catalyst mesh comprises a copper support mesh and a nanoparticle layer disposed on the copper support mesh. The nanoparticle layer comprises $Cu_2O$ and $CuO$. The method involves treating the copper mesh support with a plant extract to form a treated mesh and annealing the treated mesh at 210 to 500° C. The nanomaterial catalyst mesh is used in a method of photodegrading an organic pollutant, preferably a dye, involving hydrogen peroxide and visible light.

18 Claims, 9 Drawing Sheets

(56) References Cited

U.S. PATENT DOCUMENTS

| | | | | |
|---|---|---|---|---|
| 2009/0269269 A1* | 10/2009 | White | ............ | B01J 23/72 |
| | | | | 423/437.2 |
| 2011/0172085 A1* | 7/2011 | Wolk | ............ | B01J 23/72 |
| | | | | 502/84 |
| 2019/0264339 A1* | 8/2019 | Geioushy | ............ | C25B 11/091 |
| 2021/0322958 A1* | 10/2021 | Huang | ............ | C07C 67/40 |

FOREIGN PATENT DOCUMENTS

| | | |
|---|---|---|
| CN | 110184622 B | 3/2021 |
| IN | 237381 | 12/2009 |

OTHER PUBLICATIONS

Banerjee, et al. ; Amorphous $Cu_{2-\delta}O$ as Passivation Layer for Ultra Long Stability of Copper Oxide Nanowires in Photoelectrochemical Environments ; Journal of the Electrochemical Society, 165(7) ; 9 Pages.

Nagajyothi, et al. ; Green synthesis: Photocatalytic degradation of textile dyes using metal and metal oxide nanoparticles-latest trends and advancements ; Critical Reviews in Environmental Science and Technology, 50:24 ; Dec. 30, 2019 ; 108 Pages.

\* cited by examiner

FIG. 4G.
FIG. 4H.
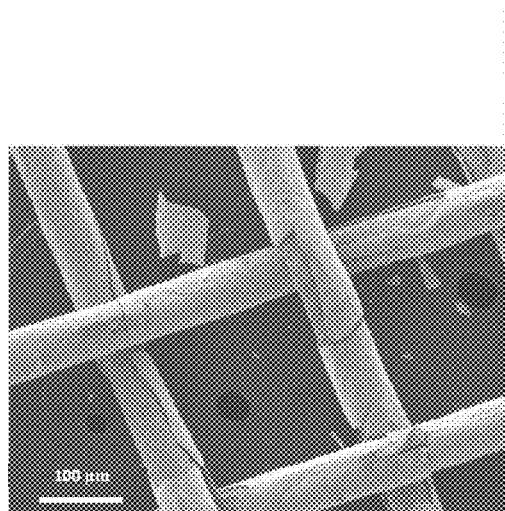
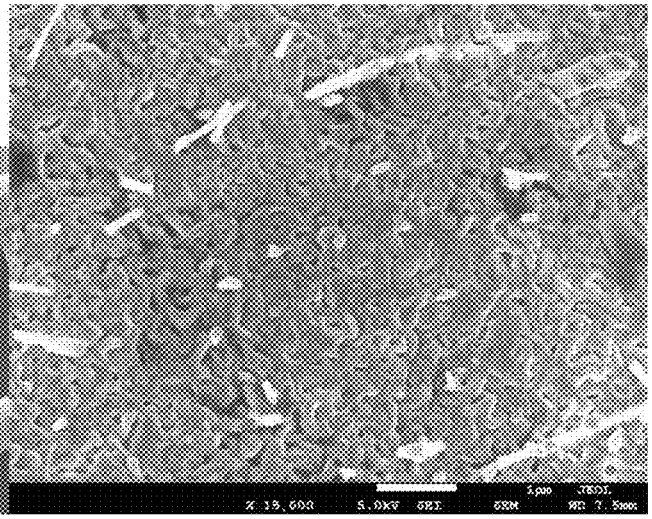
FIG. 4I.
FIG. 4J.
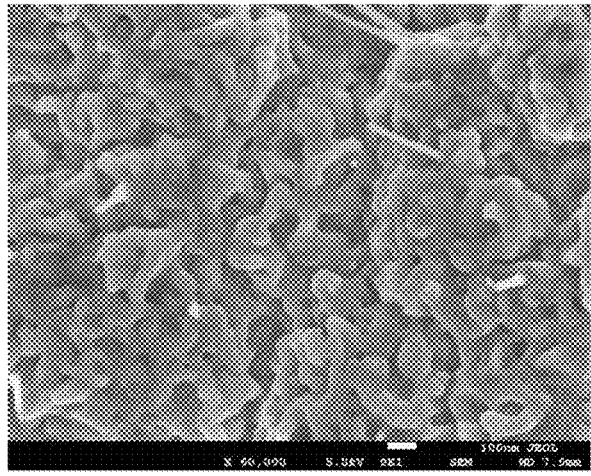
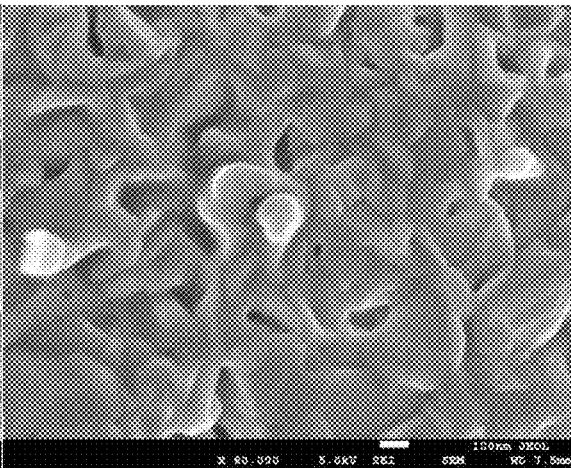

FIG. 5A.
FIG. 5B.
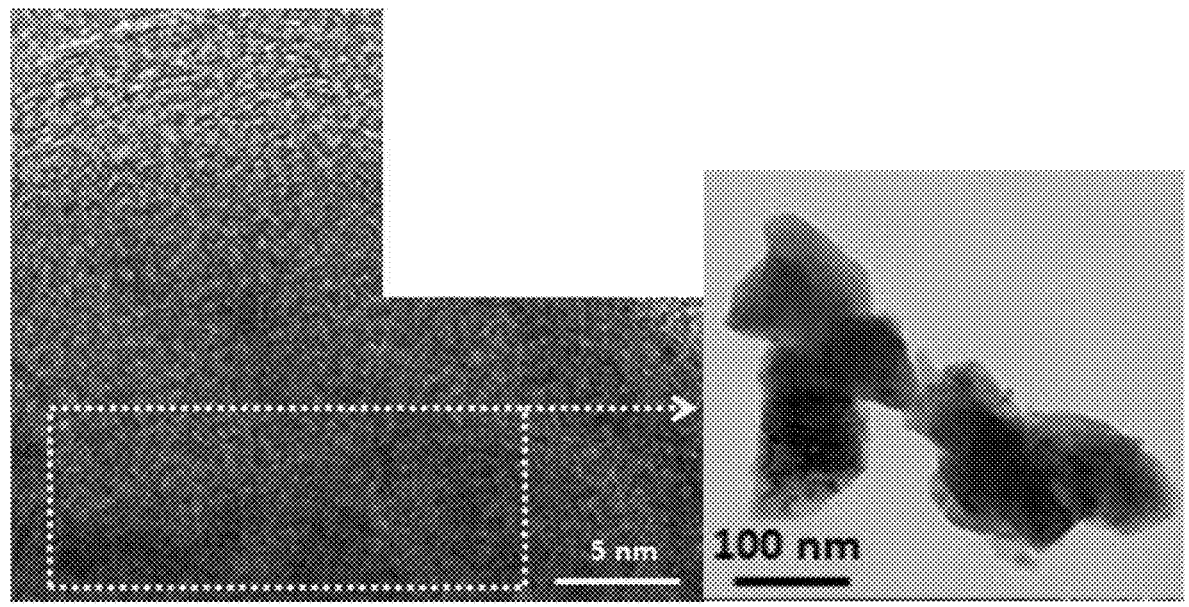
FIG. 5C.
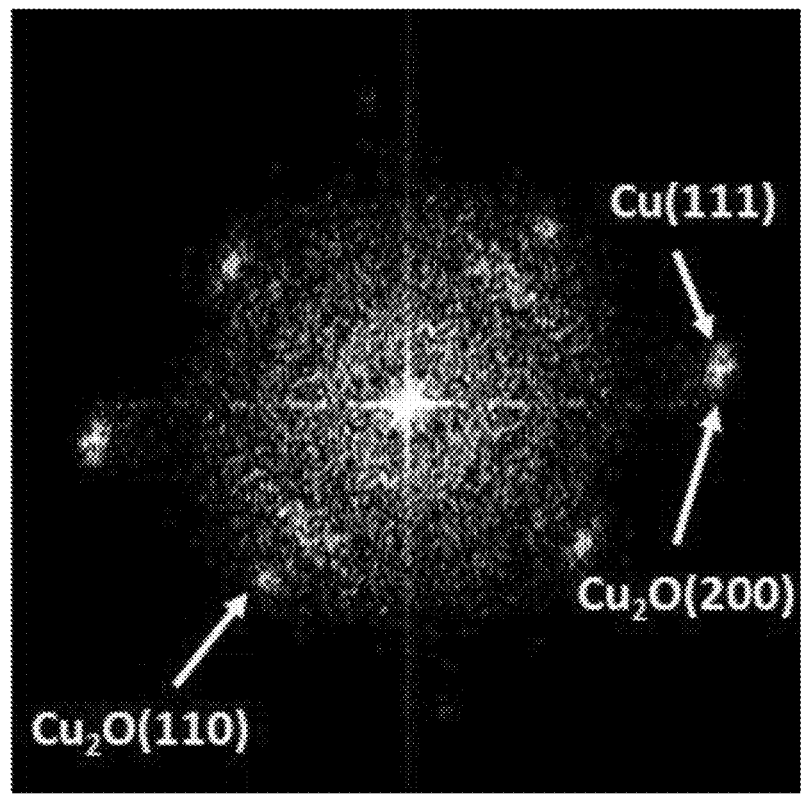

FIG. 6.
FIG. 7.
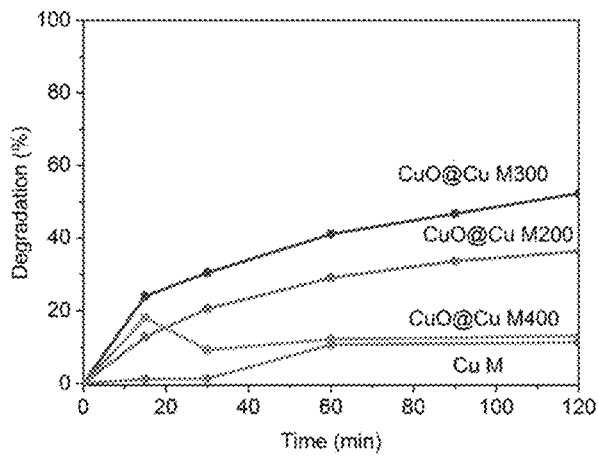
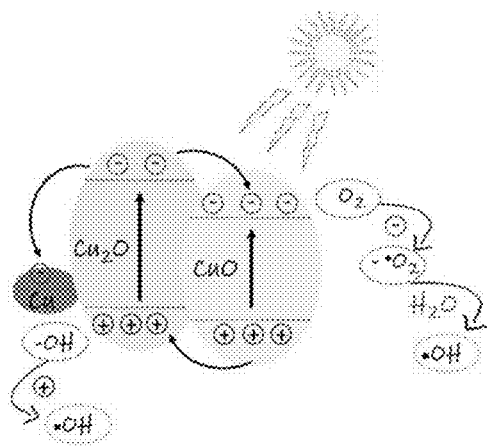
FIG. 8A.
FIG. 8B.
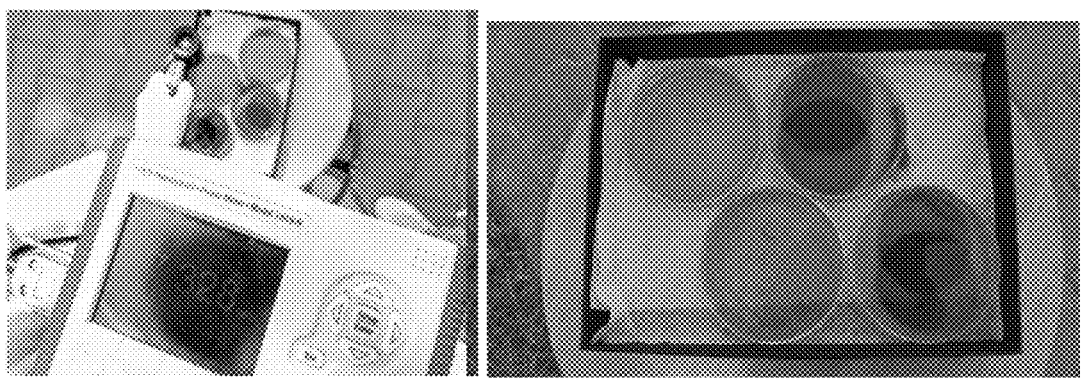
FIG. 9A.
FIG. 9B.
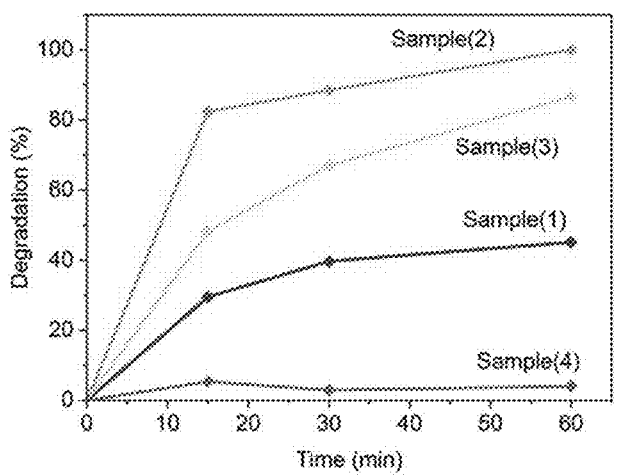
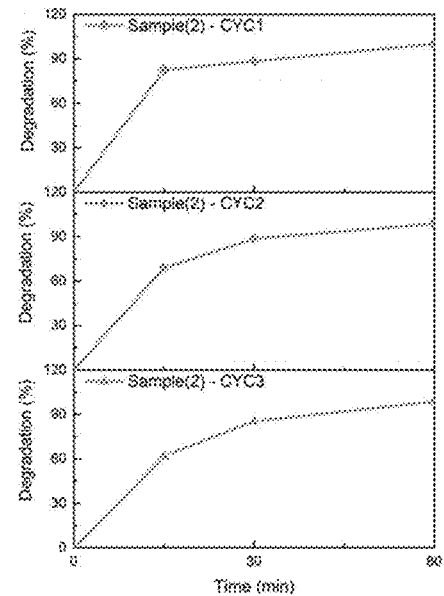

METHOD OF FORMING COPPER OXIDE-ON-COPPER NANOMATERIAL CATALYST MESH

BACKGROUND OF THE INVENTION

Field of the Invention

The present disclosure relates to a method of forming a copper oxide-on-copper nanomaterial catalyst mesh, a nanomaterial catalyst mesh formed by the method, and a method of photodegrading an organic pollutant using the nanomaterial catalyst mesh. The catalyst mesh has a copper mesh support and a nanoparticle layer which contains CuO and $Cu_2O$ disposed on the copper mesh support.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Wastewater treatment is critical in addressing major global issues around pollution and production of safe water resources for activities such as farming and human consumption. Currently, however, wastewater treatment is an activity which requires very large amounts of energy. Further, according to the International Energy Agency (IEA), by 2040 the total energy needed for wastewater treatment will increase by 60% in excess of what it was in 2014. Such interdependency of water purification and energy usage has created a need for materials for and methods of wastewater treatment which are both eco-friendly and energy efficient.

Among the numerous methods for wastewater treatment which have been investigated, photocatalysis, particularly solar photocatalysis, which relies on clean and sustainable sunlight, has been proven to be one of the most attractive methods. Solar photocatalysis is typically characterized by robust catalysts, wide pollutant treatment scope, and efficient methods [S. Dong, et. al., RSC Adv., 5, 19, 2015, 14610-14630]. It is of great importance to utilize catalysts that are able to use visible light, and meet several practical demands on the other, such as multi-functionality, wide pollutant treatment scope, cost-effectiveness, recyclability, and facile methods of fabrication. For these reasons heterogeneous copper oxides/copper ($Cu_xO@Cu$) catalysts have emerged as promising photocatalysts, and proved to be more efficient catalysts than pure copper oxides [S. Sun, Nanoscale, 7, 25, 2015, 10850-10882 and B. Meyer, et. al., Phys. Status Solidi B, 249, 8, 2012, 1487-1509]. These enhancements have been attributed to the formation of $Cu_xO/Cu$ heterojunctions which boost the separation of the photogenerated electron-hole pairs, and hence improve the photocatalytic activity [G. Mamba, et. al., J. Catal., 353, 2017, 133-140]. Most of the investigated $Cu_xO@Cu$ composites for water treatment have been in the form of nanoparticles, with a few reported work on $Cu_xO@Cu$ films [L. Xu, et. al., J. Alloys Compd., 695, 2017, 263-269; M. Kamazani, et. al., Adv. Powder Technol., 28, 2017, 2078-2086; D. Jiang, et. al., Appl. Catal., B, 211, 2017, 199-204; T. Kou, et. al., RSC Adv., 2, 33, 2012, 12636-12643; H. Al-Jawhari, et. al., Mater. Lett., 254, 2019, 233-236; and O. Baghriche, et. al., Catal. Today, 284, 2017, 77-83]. Recently, $Cu_xO@Cu$ deposited on 3D Cu-base, such as copper mesh or copper foam, have received more attention due to their larger surface areas [H. Li, et. al., Appl. Catal., B, 207, 2017, 134-142]. For instance, Zhou et al. showed that $CuWO_4@Cu_2O$ film prepared on copper mesh has a sufficient capacity for both separating oil/water mixtures and cleaning wastewater of organic pollutants [C. Zhou, et. al., Chem. Eng. J., 307, 2017, 803-811]. Similarly, Yang Lu et al. have used CuO nano-films grown on a copper foam as both supercapacitor electrodes and photocatalysts for dye degradation [Y. Lu, et. al., ACS Appl. Mater. Interfaces, 7, 18, 2015, 9682-9690].

Cu-based catalysts have been widely investigated because of their high abundance, low-budget, nontoxicity and their variety of valence states ($Cu^0$, $Cu^+$, and $Cu^{2+}$), which is advantageous for electrocatalytic activity [H. Lee, X. Wu, L. Sun, Nanoscale, 12, 7, 2020, 4187-4218]. In general, heterostructured Cu-based catalysts, such as $Cu_2O/TiO_2$, $Co_3O_4$—CuO, and $Cu/Cu_2O$, have been found to be superior to their unitary components [B. Long, et. al., Appl. Catal. B Environ., 243, 2019, 365-372; A. Tahira, et. al., Int. J. Hydrogen Energy, 44, 48, 2019, 26148-26157; and J. Zhao, et. al., ACS Catal., 5, 7, 2015, 4115-4120]. This enhancement of catalytic activity has been attributed to composition adjustability, as well as the increased defects on material interfaces which supplied more accessible active sites [J. Wei, et. al., Nano-Micro Lett., 10, 4, 2018, 75 and Y. Wei, et. al., Appl. Surf. Sci., 476, 2019, 966-971].

However, such heterojunction catalysts have typically been fabricated by complex procedures involving multiple steps, where either high temperatures or corrosive concentrated reagents, such as NaOH and $H_2O_2$, had been employed [J. Y. Zheng, et. al., RSC Adv., 4, 36, 2014, 18616-18620 and J. Lv, et. al., Sensor. Actuator. B Chem., 248, 2017, 630-638].

In previous work, spinach leaf extracts were used as a natural alkaline solution to transform copper powder to copper oxide films using the surface oxidation reaction [S. Al-Shehri, et. al., Surf. Coat. Tech., 320, 2017, 246-251]. In this process, $Cu^{2+}$ ions are released continuously from the Cu substance into the alkaline solution whereas the naturally dissolved $O_2$ is reduced. Spinach has a pH level of 6.6-7.2 when cooked. Use of a natural green alkaline solution to transform copper microfibers to a flexible $Cu_xO$ framework has not been reported previously.

SUMMARY OF THE INVENTION

The present disclosure relates to a method of forming a nanomaterial catalyst mesh comprising a copper mesh support and a nanoparticle layer comprising CuO and $Cu_2O$ disposed on the copper mesh support, the method comprising treating the copper mesh support with a plant extract to form a treated mesh; and annealing the treated mesh at 210 to 500° C. to form the nanomaterial catalyst mesh, wherein the nanoparticle layer comprises $Cu_2O$ nanoparticles having a mean particle size of 10 to 500 nm.

In some embodiments, the copper mesh support has a wire diameter of 25 to 75 μm and an opening size of 100 to 300 μm.

In some embodiments, the plant extract is a spinach leaf extract.

In some embodiments, the spinach leaf extract is an aqueous spinach leaf extract prepared by boiling spinach leaves in water in an amount of 5 to 35 g spinach leaves per 100 mL of water to form a spinach leaf suspension; and filtering the spinach leaf suspension to form the aqueous spinach leaf extract.

In some embodiments, the treating is performed at 80 to 100° C. for 15 to 120 minutes and the annealing is performed for 15 to 120 minutes.

In some embodiments, the nanoparticle layer has a $Cu^+$:$Cu^{2+}$ ratio of 0.25:1 to 1:1 by XPS.

In some embodiments, the $Cu_2O$ nanoparticles are crystalline by PXRD and/or electron diffraction.

In some embodiments, the nanoparticle layer further comprises crystalline CuO by PXRD and/or electron diffraction.

In some embodiments, the $Cu_2O$ nanoparticles are core-shell nanoparticles comprising a core of $Cu_2O$ and a shell of CuO.

In some embodiments, the core-shell nanoparticles have a mean particle size of 10 to 500 nm.

The present disclosure also relates to a nanomaterial catalyst mesh, comprising a copper mesh support and a nanoparticle layer comprising CuO and $Cu_2O$ disposed on the copper mesh support, wherein the nanomaterial catalyst mesh has a wire diameter of 25 to 75 μm and an opening size of 100 to 300 μm, wherein the nanoparticle layer comprises $Cu_2O$ nanoparticles having a mean particle size of 10 to 500 nm.

In some embodiments, the nanoparticle layer comprising CuO and $Cu_2O$ has a $Cu^+$:$Cu^{2+}$ ratio of 0.25:1 to 1:1.

In some embodiments, the $Cu_2O$ nanoparticles are crystalline PXRD and/or electron diffraction.

In some embodiments, the nanoparticle layer further comprises crystalline CuO by PXRD and/or electron diffraction.

In some embodiments, the $Cu_2O$ nanoparticles are core-shell nanoparticles comprising a core of $Cu_2O$ and a shell of CuO.

In some embodiments, the core-shell nanoparticles have a mean particle size of 10 to 500 nm.

The present disclosure also relates to a method of photodegrading an organic pollutant, the method comprising contacting a photodegradation solution comprising the organic pollutant and hydrogen peroxide with the nanomaterial catalyst mesh to form a catalytic mixture; and irradiating the catalytic mixture with visible light.

In some embodiments, the irradiating is performed at an irradiation intensity of 4 to 10 $mW/cm^2$.

In some embodiments, the organic pollutant is a dye.

In some embodiments, the photodegradation solution has a weight ratio of dye to hydrogen peroxide of 2:1 to 5:1.

In some embodiments, the dye is methylene blue and the method degrades greater than 95% of an initial amount of methylene blue in 30 to 90 minutes.

BRIEF DESCRIPTION OF THE DRAWINGS

FIG. 1A is the copper mesh support, FIG. 1B is $Cu_xO$@Cu M200, and FIG. 1C is $Cu_xO$@Cu M300;

FIGS. 4A-4J are SEM images showing the morphology of the copper mesh support (FIG. 4A low magnification and FIG. 4B high magnification), $Cu_xO$@Cu M200 (FIG. 4C low magnification and FIG. 4D high magnification), $Cu_xO$@Cu M300 (FIG. 4E low magnification, FIG. 4F high magnification, and FIG. 4I very high magnification), and $Cu_xO$@Cu M400 (FIG. 4G low magnification, FIG. 4H high magnification, and FIG. 4J very high magnification);

FIGS. 5A-5C are TEM images of the nanoparticle layer from an exemplary sample of CuxO@Cu M300 with FIG. 5A showing a high-resolution TEM image of a single nanoparticle, FIG. 5B showing a low resolution TEM image of a group of nanoparticles, one of which is the nanoparticle shown in FIG. 5A, and FIG. 5C showing a selected area electron diffraction image of the nanoparticle shown in FIG. 5A;

FIG. 6 is a plot of the photocatalytic activity of Cu M, $Cu_xO$@Cu M200, $Cu_xO$@Cu M300, and $Cu_xO$@Cu M400 in the degradation of methylene blue under sunlight irradiation of ≈7 $mW/cm^2$;

FIG. 7 is a schematic diagram of proposed photocatalytic activity for heterogeneous $Cu_xO$@Cu composites;

FIGS. 8A-8B are photographs of exemplary photocatalytic measurements of S1 ($Cu_xO$@Cu M300 only), S2 ($Cu_xO$@Cu M300+$H_2O_2$), S3 ($H_2O_2$ only), and S4 (no catalyst or $H_2O_2$) where FIG. 8A depicts measurement of the sunlight irradiation intensity and FIG. 8B depicts the samples S1, S2, S3, and S4;

FIGS. 9A-9D are plots of the photocatalytic activity of various nanomaterial catalyst meshes for the degradation of methylene blue where FIG. 9A shows plots of the degradation percentage of methylene blue (10 mg/l) using S1, S2, S3 and S4 under low intensity outdoor light (~7 $mW/cm^2$), FIG. 9B shows repetitive methylene blue degradation using 3 succeeding cycles of S2, FIG. 9C shows the kinetics of methylene blue degradation for S1, S2 (1st cycle), and S3, and FIG. 9D shows the kinetics of methylene blue degradation in case of 2nd and 3rd cycles of S2;

DETAILED DESCRIPTION OF THE INVENTION

Figures 1A, 1B:
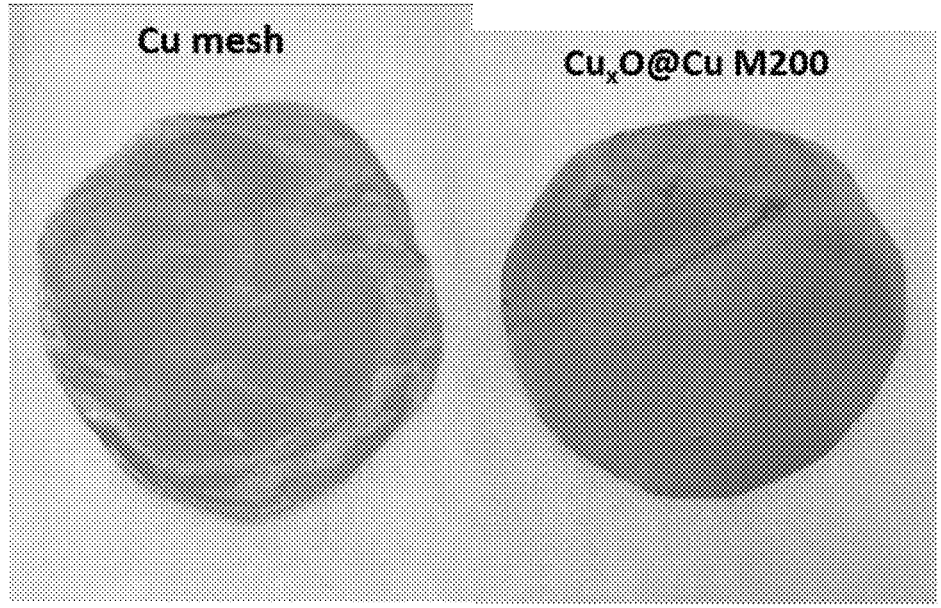
FIGS. 1A-1C are photographs of samples before and after annealing, where
Figure 1C:
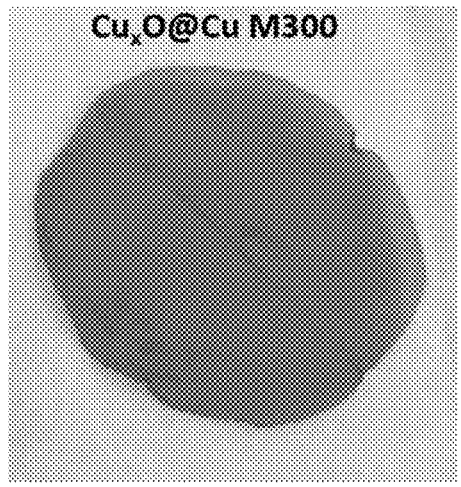

In the following description, it is understood that other embodiments may be utilized and structural and operational changes may be made without departure from the scope of the present embodiments disclosed herein.

Definitions

As used herein the words "a" and "an" and the like carry the meaning of "one or more."

As used herein, the terms "optional" or "optionally" means that the subsequently described event(s) can or cannot occur or the subsequently described component(s) may or may not be present (e.g., 0 wt. %).

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium. Isotopes of oxygen include $^{16}O$, $^{17}O$, and $^{18}O$. Isotopes of copper include $^{63}Cu$, $^{64}Cu$, $^{65}Cu$, and $^{67}Cu$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

The phrase "substantially free", unless otherwise specified, describes a particular component being present in an amount of less than about 1 wt. %, preferably less than about 0.5 wt. %, more preferably less than about 0.1 wt. %, even more preferably less than about 0.05 wt. %, even more preferably less than about 0.01 wt. %, even more preferably less than about 0.001 wt. %, yet even more preferably 0 wt. %, relative to a total weight of the composition being discussed.

Method of Forming a Nanomaterial Catalyst Mesh

According to a first aspect, the present disclosure relates to a method of forming a nanomaterial catalyst mesh. The nanomaterial catalyst mesh comprises a copper mesh support and a nanoparticle layer comprising CuO and $Cu_2O$ disposed on the copper mesh support. The method comprises treating the copper mesh support with a plant extract to form a treated mesh; and annealing the treated mesh at 210 to 500° C., preferably 225 to 475° C., preferably 250 to 450° C., preferably 275 to 425° C., preferably 290 to 410° C., preferably 300 to 400° C. to form the nanomaterial catalyst mesh. The nanoparticle layer comprises $Cu_2O$ nanoparticles having a mean particle size of 10 to 500 nm.

In some embodiments, the copper mesh support is constructed of copper. In some embodiments, the copper mesh support comprises a copper coating disposed upon another material, for example a non-copper metal, a ceramic, or fiberglass. Examples of such suitable non-copper metals include, but are not limited to aluminum, carbon steel, stainless steel, platinum, silver, nickel, and alloys thereof. The ceramic may be in the form of a monolith, sometimes referred to as a cellular monolith or honeycomb monolith, having any suitable cellular or opening shape, for example square, rectangular, round, or hexagonal. Examples of such suitable ceramics include, but are not limited to cordierite, alumina, silica, titania, aluminosilicates such as zeolites, ceria, zirconia, and mixtures thereof. It should be understood that in the above description, "copper" is understood to also include alloys which have copper as a principle component (i.e. comprise greater than 50 wt % copper). In some embodiments, the copper support mesh comprises at least 60 wt % preferably at least 65 wt %, preferably at least 70 wt %, preferably at least 75 wt %, preferably at least 80 wt %, preferably at least 85 wt %, preferably at least 90 wt %, preferably at least 92.5 wt %, preferably at least 95 wt %, preferably at least 97.5 wt %, preferably at least 98 wt %, preferably at least 98.5 wt %, preferably at least 99 wt %, preferably at least 99.25 wt %, preferably at least 99.5 wt %, preferably at least 99.75, preferably at least 99.9 wt % copper. In some embodiments, the copper support mesh is 99.99+ wt % pure copper. Examples of such alloys include, but are not limited to gilding metal; Muntz metal; beryllium copper; nickel silver; cupronickel; Dunce metal; bronzes such as manganese bronze, tin bronze, leaded tin bronze, aluminum bronze, silicon bronze, phosphor bronze, commercial bronze, architectural bronze, mild bronze, bell metal, arsenical bronze, speculum metal, and cymbal alloy; and brasses such as Abyssinian gold, admiralty brass, Aich's alloy, aluminum brass, arsenical brass, cartridge brass, common brass, DZR brass, delta metal, free machining brass, high brass, leaded brass, low brass, manganese brass, naval brass, nickel brass, Nordic gold, drichalcum, Prince's metal, red brass (also known as gunmetal), tombac, silicon tombac, tonval brass, and yellow brass.

In general, the copper mesh support may be any type of mesh known to one of ordinary skill in the art. Examples of suitable types of mesh include, but are not limited to wire meshes, expanded meshes, and perforated meshes. In some embodiments, the copper mesh support is a wire mesh. The wire mesh may be a woven wire mesh or a welded wire mesh. The wire mesh may have openings having any suitable shape known to one of ordinary skill in the art, e.g. square, rectangular, rhombic (also known as diamond), and hexagonal. A woven wire mesh may be woven in any suitable weaving pattern known to one of ordinary skill in the art. Examples of such weaving patterns include, but are not limited to, plain weave, twilled weave, crimped weave, flat top weave, and Dutch weave. In preferred embodiments, the copper mesh support is a wire mesh. In some embodiments, the copper mesh support has a wire diameter of 25 to 75 µm, preferably 27.5 to 72.5 µm, preferably 30 to 70 µm, preferably 32.5 to 67.5 µm, preferably 35 to 65 µm, preferably 37.5 to 62.5 µm, preferably 40 to 60 µm, preferably 42.5 to 57.5 µm, preferably 45 to 55 µm, preferably 47.5 to 52.5 µm, preferably 49 to 51 µm, preferably about 50 µm. In some embodiments, the copper mesh support has an opening size of 100 to 300 µm, preferably 110 to 290 pin, preferably 120 to 280 µm, preferably 130 to 270 µm, preferably 140 to 260 µm, preferably 150 to 250 µm, preferably 160 to 240 µm, preferably 170 to 230 µm, preferably 180 to 220 µm, preferably 185 to 215 µm, preferably 190 to 210 µm, preferably 195 to 205 µm, preferably about 200 µm.

In general, the plant extract may be an extract of any suitable plant or plant mixture known to one of ordinary skill in the art. The extract may be made using any suitable part of the plant or plant mixture, including, but not limited to leaves, stems, roots, bark, flowers, fruits, buds, and whole plants. Examples of suitable plants which may comprise the plant extract include, but are not limited to spinach (*Spinacia oleracea*), parsley, kale, arugula, broccoli, chard, collard greens, mustard greens, cabbage, lettuce, dandelion greens, brussels sprouts, basil, thyme, beet greens, watercress, endive, bok choy, turnip greens, alfalfa, clover, amaranth, sorrel, fennel, anise hyssop, Welsh onion, leeks, sissoo spinach (*Alternanthera sissoo*), Malabar spinach (*Basella alba*), and longevity spinach (*Gynura procumbens*).

In general, the plant extract may be prepared by any suitable method known to one of ordinary skill in the art. Such a method may involve, for example, plant tissue homogenization, soaking, maceration, digestion, decoction, infusion, percolation, Soxhlet extraction, superficial extraction, ultrasound-assisted, microwave-assisted extraction, or any combination thereof. In some embodiments, the plant extract is prepared by soaking. The soaking may be performed at any suitable temperature in which the solvent is a liquid (i.e. from the melting point to the boiling point of the solvent). The soaking may or may not involve agitation, such as shaking or stirring. This soaking may create a plant suspension which comprises a liquid solvent extract and suspended plant solids. In preferred embodiments, the plant solids are removed following the soaking. In general, the plant solids may be removed by any suitable technique known to one of ordinary skill in the art. Examples of such suitable techniques include, but are not limited to decantation, centrifugation, and filtration, but excluding techniques such as evaporation and distillation.

In general, any suitable solvent known to one of ordinary skill in the art may be used to prepare the plant extract. Examples of such suitable solvents include, but are not limited to hexane, petroleum ether, diethyl ether, ethyl acetate, chloroform, dichloromethane, acetone, n-butanol, isopropanol, n-propanol, ethanol, methanol, water, and mixtures thereof. In some embodiments, the solvent comprises water. In preferred embodiments, the solvent is water. In preferred embodiments, the plant extract is substantially free of glycerol. In general, the plant or plant mixture may be used in any suitable amount known to one of ordinary skill in the art to prepare the extract. In some embodiments, the plant extract is prepared at a concentration (which may be measured in the amount of plant or plant mixture per volume of solvent) at which it is intended to be used. In alternative embodiments, the plant extract is not prepared at a concentration at which it is intended to be used. In such embodiments, a concentration of the extract may be adjusted before use in the method of forming the nanomaterial catalyst mesh. Such adjustment may be made by any suitable method known to one of ordinary skill in the art. In some embodiments, the extract is diluted to a lower concentration compared to a preparation concentration for use in the method of forming the nanomaterial catalyst mesh. In alternative embodiments, the extract is concentrated, for example by evaporation, to a higher concentration compared to the preparation concentration for use in the method of forming the nanomaterial catalyst mesh.

In some embodiments, the plant extract is a spinach (*Spinacia oleracea*) extract. In preferred embodiments, the plant extract is a spinach leaf extract. In some embodiments, the spinach leaf extract is an aqueous spinach leaf extract. In general, the aqueous spinach leaf extract may be prepared by any suitable technique or combination of techniques known to one of ordinary skill in the art as described above. Preferably, the aqueous spinach leaf extract is prepared by boiling spinach leaves in water in an amount of 5 to 35 g, preferably 7.5 to 32.5 g, preferably 10 to 30 g, preferably 11 to 29 g, preferably 12 to 28 g, preferably 13 to 27 g, preferably 14 to 26 g, preferably 15 to 25 g, preferably 16 to 24 g, preferably 17 to 23 g, preferably 18 to 22 g, preferably 18.5 to 21.5 g, preferably 19 to 21 g, preferably 19.5 to 20.5 g, preferably 20 g of spinach leaves per 100 mL of water to form a spinach leaf suspension; and filtering the spinach leaf suspension to form the aqueous spinach leaf extract.

In some embodiments, the plant extract comprises at least three selected from the group consisting of: n-hexadecanoic acid, (Z,Z)-9,12-octadecadienoic acid, (Z)-9-octadecenoic acid, octadecanoic acid, (Z)-3-(pentadec-8-en-1-yl)phenol, piperine, 2-(hydroxymethyl)-2-nitro-1,3-propanediol, and tetradecanoic acid. In some embodiments, the plant extract further comprises at least four selected from the group above. In some embodiments, the plant extract further comprises at least five selected from the group above. In some embodiments, the plant extract further comprises at least six selected from the group above. In some embodiments, the plant extract further comprises at least seven selected from the group above. In some embodiments, the plant extract further comprises at least eight selected from the group above. In some embodiments, the plant extract further comprises all of the members of the group above.

In some embodiments where the plant extract is a spinach extract, the spinach extract may further comprise at least one selected from the group consisting of a saponin, a flavonoid, a terpene, a cardenolide, a phlobatamin, a steroid, a glycoside, and a tannin.

Saponins are a class of plant glycosides in which water-soluble sugars are attached to either a lipophilic steroid or triterpenoid. This hydrophobic-hydrophilic asymmetry means that these compounds have the capacity to lower surface tension and are soap-like, similar to surfactants. Examples of saponins are aescin, araloside A, astragaloside, bacopaside, bacosides I-XI, chaconine, charantin, daucosterol, digitonin, esculeoside A, ginsenoside, glycyrrhizin, gypenoside, A-hederin, holothurin, momordin, osladin, protodioscin, pseudoginsenoside, solanine, and ziziphin.

Flavonoids are a group of naturally occurring polyphenolic compounds characterized by the flavan nucleus structure depicted below.

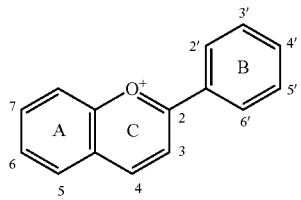

It is worth noting that the phenyl ring labeled "B" in the above image may be connected to either the 2 position as shown or to the 3 position of the "C" ring. Examples of flavonoids include, but are not limited to anthoxanthins, flavans, anthocyanidins, aurones, and chalcones. Examples of anthoxanthins include flavones such as primuletin, chrysin, tectochrysin, primentin, apigenin, acacetin, genkwanin, echioidinin, baicalein, oroxylon, negletein, norwogonin, wogonin, geraldone, tithonine, luteolin, chrysoeriol, diosmetin, pillion, velutin, norartocarpetin, artocarpetin, scutellarein, hispidulin, sorbifolin, pectolinarigenin, cirsimaritin, mikanin, isocutellarein, zapotinin, zapotin, cerrosillin, alnetin, tricin, corymbosin, nepetin, pedalitin, nordifloretin, jaceosidin, cirsiliol, eupatilin, cirsilineol, eupatorin, sinensetin, hypolaetin, onopordin, wightin, nevadensin, xanthomicrol, tangeretin, serpyllin, sudachitin, acerosin, hymenoxin, nobiletin, and scaposin; flavonols such as 3-hydroxyflavone, azaleatin, fisetin, galangin, gossypetin, isorhamnetin, kaempferide, kaempferol, morin, myricetin, natsudaidain, pachypodol, quercetin, rhamnazinm, and rhamnetin; isoflavones such as daidzein, genistein, and orobol; and neoflavonoids such as dalbergichromene, calophyllolide, coutareagenin, dalbergin, and nivetin. Examples of flavans include, but are not limited to flavanols such as catechin, epiafzelechin, fisetinidol, guibourtinidol, mesquitol, robinetinidol, apiforol, and luteoforol; flavan-3,4-diols such as leucocyanidin, leucodelphinidin, leucofisetinidin, leucomalvidin, leucopelargonidin, leucopeonidin, leucorobinetinidin, melacacidin, and teracacidin; flavanones such as blumeatin, butin, eriodictyol, hesperetin, hesperidin, homoeriodictyol, isosakuranetin, naringenin, naringin, pinocembrin, poncirin, sakuranetin, sakuranin, sterubin, and pinostrobin; and flavanonols such as taxifolin, aromadedrin, and engeletin. Examples of an anthocyanidins include, but are not limited to aurantinidin, capensinidin, cyanidin, delphinidin, europinidin, hirsutidin, malvidin, pelargonidin, peonidin, petunidin, pulchellidin, rosinidin, apigeninidin, columnidin, diosmetinidin, luteolinidin, tricetinidin, apigeninidin, and guibourtinidin. Examples of aurones include, but are not limited to aurone, 4'-chloro-2-hydroxyaurone, 4'-chlroaurone, aureusidin, sulfuretin (6,3',4'-trihydroxyaurone), hispidol (6,4'-dihydroxyaurone), and leptosidin. Examples of chalcones include, but are not limited to aurentiacin A, aurentiacin B, 2',6'-dihydroxy-4'-methoxy-3',5'-dimethyldihydrochalcone, rubone, bakuchalcone, dihydrochalcone, lapathinol, lapathone, brackenin, mixtecacin, 2',6'-dihydroxy-4'-methoxydihydrochalcone, isoliquiritin, licuraside, xanthangelols B through E, ponganone I and II, stipulin, 3,3'-dihydroxychalcone, spinochalcone A, spinochalcone B, flemistrictin A, calythropsin, dihydrocalythropsin, pedicin, fissistin, isofissistin, munchiwarin, prorepensin, lonchocarpin, and cardamonin.

Examples of terpenes include, but are not limited to carotenes such as α-carotene, β-carotene, γ-carotene, δ-carotene, ε-carotene, lycopene, neurosporene, phytofluene, and phytoene; and xanthophylls such as canthaxanthin, cryptoxanthin, zeaxanthin, astaxanthin, lutein, rubixanthin.

Examples of cardenolides include, but are not limited to acetyldigitoxins, acetyldigoxins, cymarine, digitoxin, digitoxigenin, digoxigenin, digoxin, medigoxin, neoconvalloside, ouabain, strophanthins, and strophanthidin.

Examples of steroids which may be relevant to the present disclosure include, but are not limited to brassinosteroids such as Brassinolide, 28-homobrassinolide, dolicholide, 28-homodolicholide, 28-norbrassinolide, 2-deoxybrassinlide, castasterone, dolichosterone, 2-epicastasterone, 28-nortyphasterol, typhasterol, secasterone, and secasterol, and phytosterols such as β-sitosterol, campesterol, cholesterol, stigmasterol, stigmastanol, ergosterol, lupeol, and cycloartenol.

Glycosides are molecules in which a sugar group is bonded through its anomeric carbon to another group via a glycosidic bond. Glycosides can be linked by an O- (an O-glycoside), N- (a glycosylamine), S- (a thioglycoside), or C- (a C-glycoside) glycosidic bond. A glycosidic bond refers to a bond formed between the hemiacetal or hemiketal group of a saccharide (or a molecule derived from a saccharide) and, in the case of an O-glycosidic bond the oxygen atom of a hydroxyl group of some compound such as an alcohol. In the case of an S-glycosidic bond, the bond is formed with a sulfur atom of a suitable sulfur-containing functional group. In the case of an N-glycosidic bond, the bond is formed with a nitrogen atom of a suitable nitrogen-containing functional group. In the case of a C-glycosidic bond, the bond is formed with a carbon atom. Examples of glycosides relevant to the present disclosure include, but are not limited to spinacetin 3-O-β-d-glucopyranosyl(1→6)-[β-d-apiofuranosyl(1→2)]-β-d-glucopyranoside; patuletin 3-O-β-d-(2"feruloylglucopyranosyl)(1→6)-[β-d-apiofuranosyl(1→2)]-β-d-glucopyranoside; spinacetin 3-O-β-d-(2"-p-coumaroylglucopyranosyl)(1→6)-[β-d-apiofuranosyl (1→2)]-β-d-glucopyranoside; spinacetin 3-O-β-d-(2"feruloylglucopyranosyl)(1→6)-[β-d-apiofuranosyl (1→2)]-β-d-glucopyranoside; spinacetin 3-O-β-d-(2"feruloylglucopyranosyl)(1→6)-β-d-glucopyranoside; jaceidin 4'-glucuronide; 5,3',4'-trihydroxy-3-methoxy-6:7-methylenedioxyflavone 4'-glucuronide; 5,4'-dihydroxy-3,3'-dimethoxy-6:7-methylenedioxyflavone 4'-glucuronide; patuletin 3-glucosyl(1→6)-[apiosyl(1→2)] glucoside; and patuletin and spinacetin 3-gentiobiosides.

Tannins are water-soluble polyphenols, typically having molecular weights of 500 to 20,000 Da. Typically, tannins are formed from repeat units of gallic acid or flavan-3-ol. Examples of tannins include, but are not limited to ellagitannins tannins such as punicalagins, castalagins, vescalagins, castalins, casuarictins, grandinins, punicalins, roburin As, tellimagrandin Hs, and terflavin Bs; and gallotannins such as digalloyl glucose and 1,3,6-trigalloyl glucose.

These chemicals, as well as others not named here, which are present in the extract of the plant mixture may be referred to collectively as "extract phytochemicals".

In some embodiments, the treating is performed at 80 to 100° C., preferably 81 to 99° C., preferably 82 to 98° C., preferably 83 to 97° C., preferably 84 to 96° C., preferably 85 to 95° C., preferably 86 to 94° C., preferably 87 to 93° C., preferably 88 to 92° C., preferably 89 to 91° C., preferably 90° C. for 15 to 120 minutes, preferably 20 to 110 minutes, preferably 30 to 100 minutes, preferably 35 to 90 minutes, preferably 40 to 80 minutes, preferably 45 to 75 minutes, preferably 50 to 70 minutes, preferably 55 to 65 minutes, preferably 60 minutes. In some embodiments, the annealing is performed for 15 to 120 minutes preferably 20 to 110 minutes, preferably 30 to 100 minutes, preferably 35 to 90 minutes, preferably 40 to 80 minutes, preferably 45 to 75 minutes, preferably 50 to 70 minutes, preferably 55 to 65 minutes, preferably 60 minutes. The annealing may be performed in any suitable atmosphere or gas mixture in which oxygen is present in an amount of at least 5 vol %, preferably at least 7.5 vol %, preferably at least 10 vol %, preferably at least 12.5 vol %, preferably at least 15 vol %, preferably at least 17.5 vol %, preferably at least 20 vol %. In some embodiments, the annealing is performed in an atmosphere or gas mixture in which oxygen is present in an amount of 5 to 50 vol %, preferably 7.5 to 45 vol %, preferably 10 to 40 vol %, preferably 12.5 to 35 vol %, preferably 15 to 30 vol %, preferably 17.5 to 27.5 vol %, preferably 20 to 25 vol %. Preferably, the annealing is performed in air.

Nanomaterial Catalyst Mesh

The present disclosure also relates to a nanomaterial catalyst mesh, comprising a copper mesh support and a nanoparticle layer comprising CuO and $Cu_2O$ disposed on the copper mesh support, wherein the nanomaterial catalyst mesh has a wire diameter of 25 to 75 μm and an opening size of 100 to 300 μm and the nanoparticle layer comprises $Cu_2O$ nanoparticles having a mean particle size of 10 to 500 nm, as described above.

In some embodiments, the nanoparticle layer has a $Cu^+$:$Cu^{2+}$ ratio of 0.25:1 to 1:1, preferably 0.30:1 to 0.975:1, preferably 0.35:1 to 0.95:1, preferably 0.40:1 to 0.925:1, preferably 0.45:1 to 0.90:1, preferably 0.50:1 to 0.875:1, preferably 0.525:1 to 0.85:1, preferably 0.55:1 to 0.825:1, preferably 0.575:1 to 0.80:1, preferably 0.60:1 to 0.775:1, preferably 0.625:1 to 0.75:1, preferably 0.65:1 to 0.725:1, preferably 0.675:1 to 0.70:1, preferably about 0.69:1 by XPS. In some embodiments, the nanoparticle layer has a $Cu^+$:$Cu^{2+}$ ratio which is dependent upon the temperature of the annealing. In some embodiments, the annealing is performed at about 300 C and the nanoparticle layer has a $Cu^+$:$Cu^{2+}$ ratio of 0.575:1 to 0.80:1, preferably 0.60:1 to 0.775:1, preferably 0.625:1 to 0.75:1, preferably 0.65:1 to 0.725:1, preferably 0.675:1 to 0.70:1, preferably about 0.69:1 by XPS. In some embodiments, the annealing is performed at about 400 C and the nanoparticle layer has a $Cu^+$:$Cu^{2+}$ ratio of 0.25:1 to 0.55:1, preferably 0.275:1 to 0.50:1, preferably 0.30:1 to 0.475:1, preferably 0.325:1 to 0.45:1, preferably 0.35:1 to 0.425:1, preferably 0.375:1 to 0.40:1, preferably about 0.39:1 by XPS.

In some embodiments, the $Cu_2O$ nanoparticles are crystalline by PXRD and/or electron diffraction. In some embodiments, the nanoparticle layer further comprises crystalline CuO by PXRD and/or electron diffraction. In some embodiments, the nanoparticle layer comprises CuO which is not detectable by PXRD and/or electron diffraction. In such embodiments, however CuO may still be present. Such CuO may not be detectable by PXRD for various reasons such as crystalline CuO being present in an amount less than approximately 5 wt % based on a total weight of crystalline material present, the CuO present being amorphous, and the CuO present may be in the form of particles or a film having a crystallite size which is sufficiently small so as to cause peak broadening to a degree which makes the signals indistinguishable from background or noise (e.g. smaller than ~5 nm). See, for example, ACS Nano 2019, 13, 7359-7365.

The nanoparticle layer comprising CuO and $Cu_2O$ comprises $Cu_2O$ nanoparticles. In some embodiments, the CuO may be present as separate nanoparticles, a thin film disposed upon the $Cu_2O$ nanoparticles, the copper mesh support, or both, or as a shell material disposed upon the $Cu_2O$ nanoparticles to form core-shell nanoparticles. In general, the $Cu_2O$ nanoparticles can be any shape known to one of ordinary skill in the art. Examples of suitable shapes the $Cu_2O$ nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. In such embodiments, the nanorods preferably have an aspect ratio less than 250, preferably less than 100, preferably less than 75, preferably less than 50, preferably less than 40, preferably less than 30, preferably less than 25, preferably less than 20, preferably less than 15, preferably less than 10. Nanorods having an aspect ratio greater than 250 as well as nanorods or other similarly shaped structures having an aspect ratio greater than or equal to 1000 (typically referred to as nanowires or nanowhiskers) are not a shape that the $Cu_2O$ nanoparticles are envisioned as having in any embodiments. In preferred embodiments, the nanoparticles are not nanorods.

In some embodiments, the $Cu_2O$ nanoparticles have a uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of $Cu_2O$ nanoparticles having a different shape. As used herein, the term "non-uniform shape" refers to an average consistent shape that differs by more than 10% of the distribution of $Cu_2O$ nanoparticles having a different shape. In one embodiment, the shape is uniform and at least 90% of the $Cu_2O$ nanoparticles are spherical or substantially circular, and less than 10% are polygonal. In another embodiment, the shape is non-uniform and less than 90% of the $Cu_2O$ nanoparticles are spherical or substantially circular, and greater than 10% are polygonal.

In some embodiments, the $Cu_2O$ nanoparticles have a mean particle size of 10 to 500 nm, preferably 15 to 450 nm, preferably 20 to 400 nm, preferably 25 to 350 nm, preferably 30 to 300 nm, preferably 35 to 250 nm, preferably 40 to 200 nm, preferably 45 to 175 nm, preferably 50 to 150 nm, preferably 60 to 125 nm, preferably 70 to 110 nm. In embodiments where the $Cu_2O$ nanoparticles are spherical, the particle size may refer to a particle diameter. In embodiments where the $Cu_2O$ nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the $Cu_2O$ nanoparticles have an anisotropic shape such as nanorods, the particle size may refer to a length of the nanorod, a width of the nanorod, or an average of the length and width of the nanorod. In some embodiments, the particle size refers to the diameter of a sphere having an equivalent volume as the particle.

In some embodiments, the $Cu_2O$ nanoparticles are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the $Cu_2O$ nanoparticles of the present disclosure are monodisperse having a particle size distribution ranging from 80% of the average particle size to 120% of the average particle size, preferably 90-110%, preferably 95-105% of the average particle size. In some embodiments, the $Cu_2O$ nanoparticles are not monodisperse.

In some embodiments, the $Cu_2O$ nanoparticles are core-shell nanoparticles comprising a core of $Cu_2O$ and a shell of CuO. Such core-shell nanoparticles may have a shape as described above. In some embodiments, the core-shell nanoparticles have a mean particle size of 10 to 500 nm, preferably 15 to 450 nm, preferably 20 to 400 nm, preferably 25 to 350 nm, preferably 30 to 300 nm, preferably 35 to 250 nm, preferably 40 to 200 nm, preferably 45 to 175 nm, preferably 50 to 150 nm, preferably 60 to 125 nm, preferably 70 to 110 nm. In some embodiments, the core-shell nanoparticles have a core size of 9 to 450 nm, preferably 15 to 400 nm, preferably 20 to 350 nm, preferably 25 to 300 nm, preferably 30 to 250 nm, preferably 35 to 200 nm, preferably 40 to 175 nm, preferably 45 to 150 nm, preferably 50 to 125 nm, preferably 55 to 100 nm, preferably 60 to 95 nm, preferably 65 to 85 nm. In some embodiments, the core-shell nanoparticles have a shell size of 1 to 50 nm, preferably 2 to 45 nm, preferably 3 to 42.5 nm, preferably 4 to 40 nm, preferably 5 to 37.5 nm, preferably 6 to 35 nm, preferably 7 to 32.5 nm, preferably 8 to 30 nm, preferably 9 to 27.5 nm, preferably 10 to 25 nm.

In some embodiments, the extract phytochemicals act as surface ligands for the $Cu_2O$ nanoparticles. In some embodiments, the extract phytochemicals act as surface ligands by binding non-oxidatively to a surface of the $Cu_2O$ nanoparticles. Such non-oxidative binding may occur through, for example, non-deprotonated alcohol, ether, amine, amide, carboxyl, carbonyl, thiol, disulfide, ester, or other functional group acting as an "L-type" ligand and/or physisorption. This binding is distinct from oxidative binding seen in, for example, carboxylates, alkoxides, hydroxide ions or halides, which may act as "X-type" ligands. The non-oxidative binding may occur through metal-ligand coordination type interactions between appropriate functional groups on the extract phytochemicals. The alcohol groups should exist in alcohol form, that is, bearing the hydroxyl proton. Such a form is distinct from the deprotonated alkoxide form. Additionally, there may be non-chemical interactions which cause physisorption of the extract phytochemicals to the surface of the $Cu_2O$ nanoparticles. Examples of such non-chemical interactions include electrostatic interactions such as ion (or charged species in general)-ion interactions, ion-dipole interactions, or dipole-dipole interactions; and Van der Waals interactions. While the surface of the $Cu_2O$ nanoparticles may have a charge, the extract phytochemicals may be present in either charged or uncharged form. The binding of the extract phytochemicals may also occur ionically or oxidatively. Such oxidative binding may occur, for example, through or involving the formation of, surface copper atoms formally in the +1 or +2 oxidation state but which are not fully incorporated into the $Cu_2O$ nanoparticle, or are part of another copper-containing material which may be present on the surface of the $Cu_2O$ nanoparticle (such as CuO), or through a ligand which is acting as an "X-type" ligand. An example of such oxidative binding is through a thiolate, alkoxide, or amide ion (a deprotonated amine derivative not to be confused with the organic functional group commonly depicted as —$C(O)NR_2$). In some embodiments, the extract phytochemicals act as surface ligands for the core-shell nanoparticles. In such embodiments, the surface ligands interact with the CuO shell, the interaction being as described above.

In some embodiments, the nanoparticle layer further comprises a carbon-containing coating. The carbon-containing coating may be disposed on the copper mesh support and/or the nanoparticle layer. In some embodiments, the carbon-containing coating is amorphous by PXRD. The presence of the carbon-containing coating may be confirmed by XPS. In some embodiments, the carbon-containing coating comprises extract phytochemicals as described above. In some embodiments, the carbon-containing coating comprises a metal carbonate, particularly copper carbonate. In some embodiments, the carbon-containing coating comprises graphitic carbon. In some embodiments, the carbon-containing coating comprises a carbon nanomaterial. The carbon nanomaterial may be at least one selected from the group consisting of fullerenes, graphene, graphene oxide, reduced graphene oxide, carbon nanotubes, carbon dots, and nanodiamonds.

Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

Fullerenes are molecules which consist of carbon atoms connected by single and double bonds so as to form a closed or partially closed mesh, with fused rings of five to seven atoms. Fullerenes may be hollow spheres like C60, ellipsoids like C70, or other shapes. Fullerenes typically have diameters of 0.3 nm to 2.4 nm. Examples of fullerenes include $C_{20}$, $C_{30}$, $C_{70}$, $C_{80}$, $C_{90}$, $C_{100}$, $C_{180}$, $C_{240}$, $C_{260}$, $C_{320}$, $C_{500}$, $C_{540}$, and $C_{720}$. Fullerenes frequently exist as agglomerates of individual fullerene molecules. Such agglomerates may be formed from a single type of fullerene or from multiple types of fullerenes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene. In some embodiments, the graphene nanosheets have a thickness of 0.33 to 25 nm, preferably 0.66 to 22.5 nm, preferably 1 to 20 nm, preferably 1.33 to 17.5 nm. In alternative embodiments, the graphene is in the form of graphene particles. The graphene particles may have a spherical shape, or may be shaped like blocks, flakes, ribbons, discs, granules, platelets, angular chunks, rectangular prisms, or some other shape. The graphene may be pristine graphene, functionalized graphene, graphene oxide, reduced graphene oxide, or a mixture thereof. Pristine graphene refers to graphene that has not been oxidized or otherwise functionalized. Functionalized graphene is distinguished from pristine graphene by the presence of functional groups on the surface or edge of the graphene that contain elements other than carbon and hydrogen. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene.

The carbon-containing coating may be formed during the annealing. The high temperature used in the annealing described above may convert extract phytochemicals which may be present on the treated mesh to metal carbonate, carbon nanomaterial and/or graphitic carbon.

Method of Photodegrading an Organic Pollutant

The present disclosure also relates to a method of photodegrading an organic pollutant, the method comprising contacting a photodegradation solution comprising the organic pollutant and hydrogen peroxide with the nanomaterial catalyst mesh to form a catalytic mixture; and irradiating the catalytic mixture with visible light.

In some embodiments, the organic pollutant may be a dye, a phenol, a polycyclic aromatic hydrocarbon, a herbicide, a pesticide, a persistent organic pollutant, or the like.

In some embodiments, the organic pollutant is a dye. A dye is a colored substance that chemically binds to a material it may be intended to color. Generally, a dye is applied in solution, typically aqueous solution. Examples of dyes include, but are not limited to: acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, carminic acid, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIAsH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D&C red 33, direct blue 1, disperse orange 1, eriochrome black T, evans blue, fast yellow AB, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes; thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound consisting of a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

A polycyclic aromatic hydrocarbon (PAH) is an aromatic hydrocarbon composed of multiple aromatic rings. Examples of polycyclic aromatic hydrocarbons include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta[c,d]pyrene, dibenz[a,h]anthracene, dibenzo[a,e]pyrene, dibenzo[a,h]pyrene, dibenzo[a,i]pyrene, dibenzo[a,l]pyrene, fluoranthene, fluorine, indeno[1,2,3-c,d]pyrene, 5-methylchrysene, naphthacene, pentaphene, picene, and biphenylene.

A herbicide (also known as "weedkiller") is a substance that is toxic to plants and may kill, inhibit the growth of, or prevent the germination of plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as: aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciproflaxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridiazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapiprolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as an herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

A persistent organic pollutant is a toxic organic chemical that adversely affects human and environmental health, can be transported by wind and water, and can persist for years, decades, or centuries owing to resistance to environmental degradation by natural chemical, biological, or photolytic processes. Persistent organic pollutants are regulated by the United Nations Environment Programme 2001 Stockholm Convention on Persistent Organic Pollutants. Examples of persistent organic pollutants are Aldrin, chlordane, dieldrin, endrin, heptachlor, hexachlorobenzene, mirex, toxaphene, polychlorinated biphenyl (PCBs), dichlorodiphenyltrichloroethane (DDT), dioxins, polychlorinated dibenzofurans, chlordecone, hexachlorocyclohexane (α- and β-), hexabromodiphenyl ether, lindane, pentachlorobenzene, tetrabromodiphenyl ether, perfluorooctanesulfonic acid, endosulfans, and hexabromocyclododecane.

In preferred embodiments, the organic pollutant is a dye.

In some embodiments, the photodegradation solution has a weight ratio of dye to hydrogen peroxide of 2:1 to 5:1, preferably 2.25:1 to 4.75:1, preferably 2.5:1 to 4.5:1, preferably 2.75:1 to 4.25:1, preferably 3:1 to 4:1, preferably 3.25:1 to 3.75:1, preferably 3.4:1 to 3.7:1, preferably 3.5:1 to 3.6:1.

In some embodiments, the irradiation is performed at an irradiation intensity of 4.0 to 10.0 mW/cm$^2$, preferably 4.25 to 9.75 mW/cm$^2$, preferably 4.5 to 9.5 mW/cm$^2$, preferably 4.75 to 9.25 mW/cm$^2$, preferably 5.0 to 9.0 mW/cm$^2$, preferably 5.25 to 8.75 mW/cm$^2$, preferably 5.5 to 8.5 mW/cm$^2$, preferably 5.75 to 8.25 mW/cm$^2$, preferably 6.0 to 8.0 mW/cm$^2$, preferably 6.25 to 7.75 mW/cm$^2$, preferably 6.5 to 7.5 mW/cm$^2$, preferably 6.75 to 7.25 mW/cm$^2$, preferably 6.9 to 7.1 mW/cm$^2$, preferably about 7 mW/cm$^2$.

In general, the irradiation with visible light may be performed by any suitable technique and/or with any suitable equipment (e.g. visible light source) known to one of ordinary skill in the art. In some embodiments, the visible light source is the sun. In some embodiments, the visible light source is an artificial light source. Examples of artificial light sources include, but are not limited to an incandescent lamp, an argon flash lamp, a carbide lamp, gas lighting, a kerosene lamp, an oil lamp, an arc lamp, a flashtube, a gas discharge lamp, an electrodeless lamp, an excimer lamp, a fluorescent lamp, a carbon arc lamp, a ceramic discharge metal-halide lamp, a mercury-vapor lamp, a sodium-vapor lamp, a xenon arc lamp, a neon lamp, a plasma lamp, an LED, a light-emitting electrochemical cell, an electroluminescent material, a laser including, but not limited to chemical, dye, free-electron, gas, ion, diode, metal-vapor, quantum well, ruby, and solid-state type lasers, and a deuterium arc lamp. In some embodiments, a single type of light source is used. In alternative embodiments, more than one type of light source is used. In some embodiments, the light source has a light output comprising visible light and a significant percentage (i.e. at least 5%, preferably at least 10% of a total energy output) of at least one selected from the group consisting of UV light and infrared light.

In preferred embodiments, the photodegradation solution is an aqueous solution.

In some embodiments, the dye is methylene blue and the method degrades greater than 95%, preferably greater than 95.5%, preferably greater than 96%, preferably greater than 96.5%, preferably greater than 97%, preferably greater than 97.5%, preferably greater than 98%, preferably greater than 98.5%, preferably greater than 99%, preferably greater than 99.5%, preferably greater than 99.9% of an initial amount of methylene blue in 30 to 90 minutes, preferably 35 to 85 minutes, preferably 40 to 80 minutes, preferably 45 to 75 minutes, preferably 50 to 70 minutes, preferably 55 to 65 minutes, preferably 60 minutes.

In some embodiments, the method photodegrades methylene blue at a rate of 50 to 125 m/min, preferably 55 to 110 m/min, preferably 60 to 100 m/min, preferably 62.5 to 95 m/min, preferably 65 to 90 m/min, preferably 67.5 to 85 m/min, preferably 70 to 82.5 m/min, preferably 72.5 to 80 m/min, preferably 75 to 77.5 m/min. In some embodiments, the rate is an average rate, the average rate being determined across an entirety of an irradiation duration. Alternatively, the average rate may be determined across an irradiation period, the irradiation period being less than the entirety of the irradiation duration. In some embodiments, the method produces an initial rate during a first irradiation period. In such embodiments, the method may produce a second rate during a second irradiation period. In such embodiments, the initial rate may be higher than the second rate. The first irradiation period may cause or coincide with a removal of the carbon-containing coating. The presence of carbon-containing coating may block catalytic active sites and/or consume photogenerated electrons, causing the lower initial rate during the first irradiation period.

In general, the method may be performed as a batch process or a continuous process. In some embodiments, the method involves stirring or agitation. Such stirring or agitation may be performed using any suitable technique or with any suitable equipment (e.g. magnetic stirrer, mechanical stirrer, ultrasonic mixer, etc.) known to one of ordinary skill in the art. The nanomaterial catalyst mesh may be formed into any suitable shape for use in the method. For example, the nanomaterial catalyst mesh may be substantially flat, as a single layer or as a shape comprising 10 or fewer layers, preferably 9 or fewer layers, preferably 8 or fewer layers, preferably 7 or fewer layers, preferably 6 or fewer layers, preferably 5 or fewer layers of nanomaterial catalyst mesh. In such embodiments, the photodegradation solution may be flowed over the nanomaterial catalyst mesh in a direction substantially parallel to the plane of the nanomaterial catalyst mesh or may be flowed through the nanomaterial catalyst mesh in a direction substantially perpendicular to the plane of the nanomaterial catalyst mesh. Alternatively, the nanomaterial catalyst mesh may be formed into a porous monolith, comprising more than 10 layers of nanomaterial catalyst mesh. The photodegradation solution may be passed through the monolith. Alternatively, the nanomaterial catalyst mesh may be formed into a tube, the walls of the tube comprising fewer than 10 layers, preferably fewer than 9 layers, preferably fewer than 8 layers, preferably fewer than 7 layers, preferably fewer than 6 layers, preferably fewer than 5 layers of nanomaterial catalyst mesh. In such embodiments, the photodegradation solution may be passed through the tube in a direction substantially parallel to a tube longitudinal axis.

In some embodiments, the nanomaterial catalyst mesh is recovered after the method is performed. Such recovery may be performed by any suitable technique known to one of ordinary skill in the art for separating solids and liquids. Examples of such suitable techniques include, but are not limited to decantation, centrifugation, and filtration, but excluding techniques such as evaporation and distillation.

The examples below are intended to further illustrate protocols for forming and characterizing the nanomaterial catalyst mesh as well as performing the method of photodegrading an organic pollutant and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Material Fabrication and Characterization

This green synthesis method disclosed here is based on oxidizing a copper mesh using a spinach aqueous extract at relatively low temperatures. 20 g of washed spinach leaves were boiled in 100 mL of distilled water followed by doubled filtration through Whatman filter paper (no. 4). A commercial copper mesh (99.99% Cu, the Mesh Company, UK) was cut into circles (r=6 cm). All samples were cleaned ultrasonically and sequentially in 1M HCl, ethanol, and then distilled water (5 min each). The copper mesh substrates were then immersed into a beaker containing the spinach aqueous extract and kept at 90° C. for 1 h on a hotplate. In order to optimize the oxidizing temperature of the copper mesh, samples were annealed for 1 h in a box furnace at different temperatures (200° C., 300° C., and 400° C.) in air. The copper mesh that was heated at 200° C. is denoted here by Cu$_x$O@Cu M200, with the other samples following the same structure (Cu$_x$O@Cu M300, and Cu$_x$O@Cu M400). FIGS. 1A-1F show photos of some of the samples before and after annealing. For comparison purposes, additional copper mesh substrates were heated at 300° C. and 400° C. without being immersed in the spinach extract.

The formation of copper oxide on the copper mesh was characterized by X-ray Photoelectron Spectroscopy (XPS, PHI 5000 VersaProbe-II) and X-Ray Diffraction (XRD, ARL X'TRA Thermo Scientific, equipped with CuKa source). Scanning Electron Microscope (SEM, JEOL JSM 7600F) and Transmission Electron Microscope (TEM, Tecnai Twin) were used for imaging the sample morphology.

In a typical experiment to assess photocatalytic performance, two circles of $Cu_xO@Cu$ mesh were immersed into 30 mL of a methylene blue (MB) solution (10 mg/L), and placed outdoors under sunlight irradiation of ~7 $mW/cm^2$. To ensure the steadiness of the daylight intensity throughout the whole experiment, a Newport photodetector (Model 1918-R) was used. For some samples, 0.9 mL of aqueous $H_2O_2$ with a concentration of 9% was added. The absorbance curve was measured at fixed time intervals using Thermo Scientific (Genesys 10S) UVeVis spectrophotometer. The degradation rate of MB was then calculated according to the relation:

$$\frac{A_0 - A_t}{A_0} \times 100 \quad (1)$$

where $A_0$ and $A_t$ are, respectively, the measured absorbance of MB at 665 nm before and after exposure to sunlight for time intervals, t. To check the recycling capability, pre-used mesh was rinsed with distilled water before repeating the photocatalytic test. Finally, to examine the effects of the CuxO@Cu mesh on the pH neutralization, the pH of the MB aqueous solution was measured before and after the treatment using HANNA pH Meter (HI9811-5).

Characterization Results

Figure 2A:
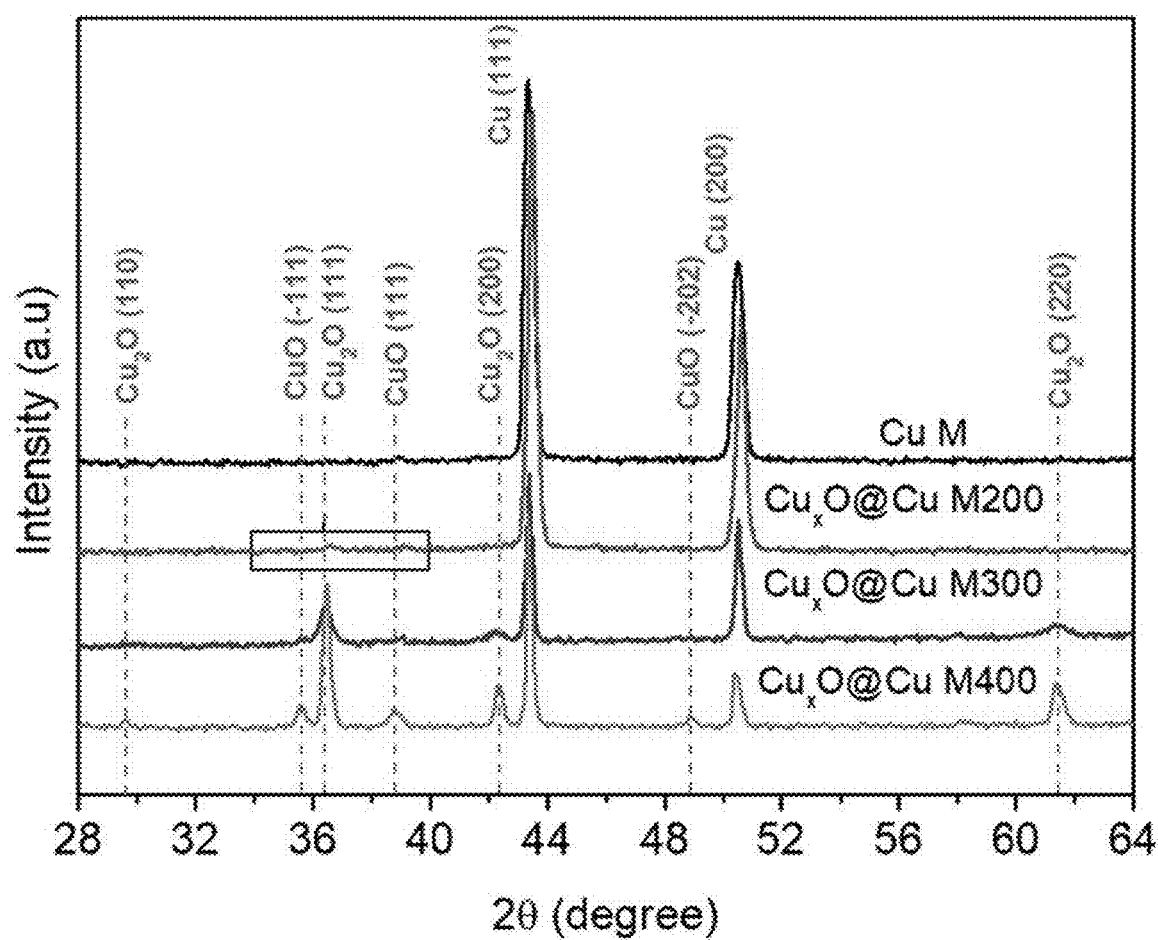
FIGS. 2A-2B are PXRD patterns for the copper mesh support and nanomaterial catalyst meshes prepared at different temperatures with FIG. 2A showing the region of 28° to 64° 2θ and FIG. 2B showing an expansion of the region 34° to 40° 2θ for $Cu_xO$@Cu M200.
Figure 2B:
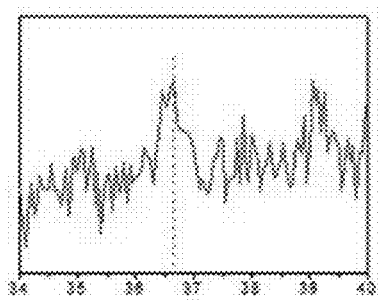

FIGS. 2A-2B shows X-ray diffraction patterns for pure Cu mesh and samples treated with spinach extract, annealed at 200° C., 300° C. and 400° C. The main diffraction peaks located at 43.3° and 50.4° correspond to the (111) and (200) planes of the metallic Cu phase. The peaks located at 36.45°, 42.4°, and 61.55° indicate that $Cu_2O$ phase is the only oxide state that is detected by XRD measurements up to 300° C. However, by increasing the annealing temperature the peaks positioned at 35.65°, 38.85°, and 48.95°, which can be attributed to cupric oxide (CuO), start to appear.

Figure 3A:
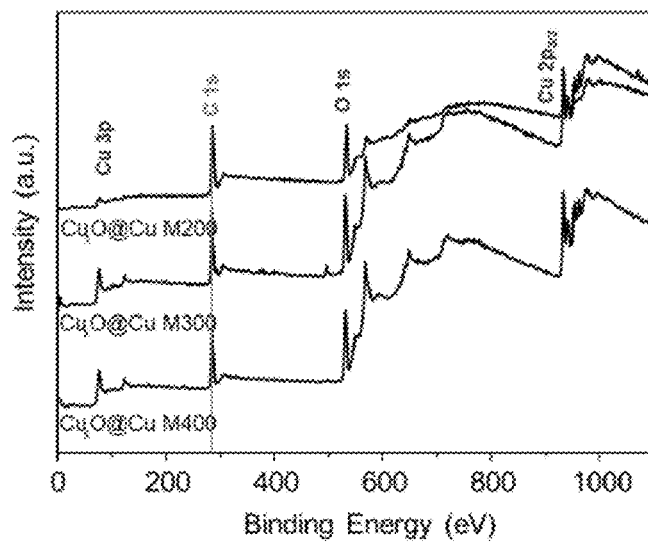
FIGS. 3A-3E are XPS spectra of the prepared nanomaterial catalyst meshes with FIG. 3A showing XPS survey spectra from 0 eV to about 1100 eV, FIG. 3B showing XPS peaks of the Cu $2p_{3/2}$ core for each of $Cu_xO$@Cu M200, $Cu_xO$@Cu M300, and $Cu_xO$@Cu M400, FIG. 3C showing an expansion of the region from about 940 eV to 948 eV for CuxO@Cu M200, FIG. 3D showing LMM Auger peaks for each of $Cu_xO$@Cu M200, $Cu_xO$@Cu M300, and $Cu_xO$@Cu M400, and FIG. 3E showing XPS peaks of the O1s for each of $Cu_xO$@Cu M200, $Cu_xO$@Cu M300, and $Cu_xO$@Cu M400.
Figure 3B:
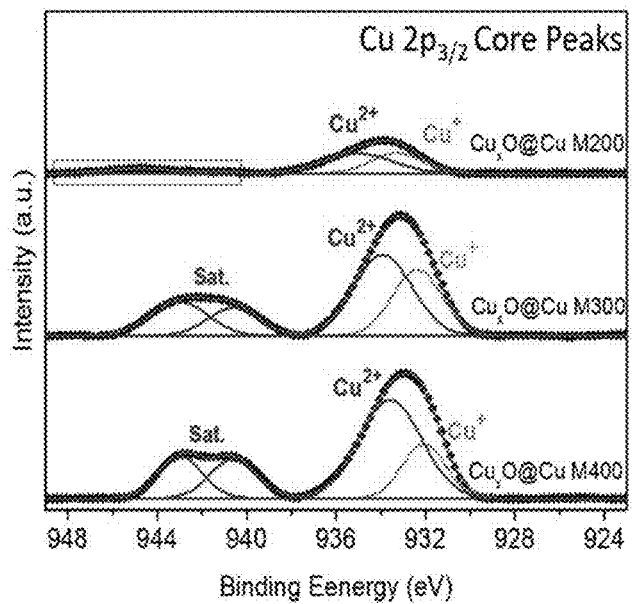
Figure 3C:
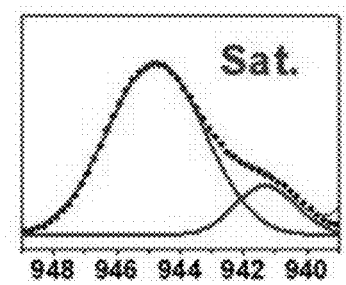
Figure 3D:
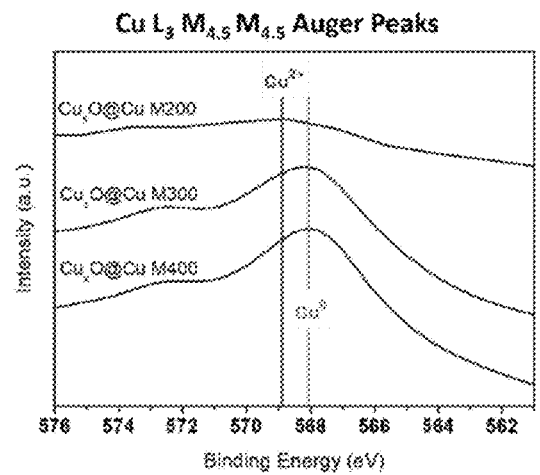
Figure 3E:
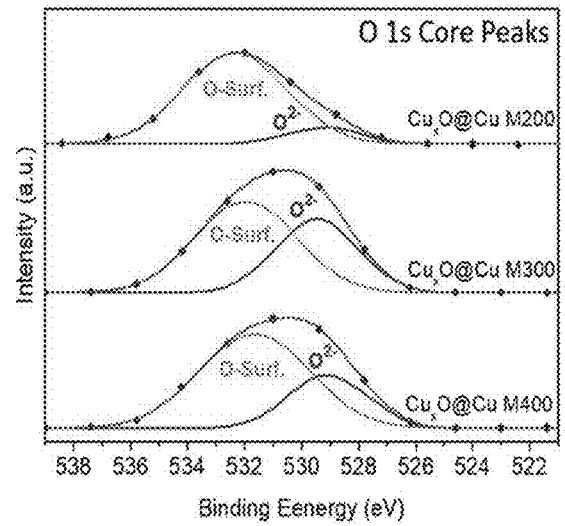
Figure 4A:
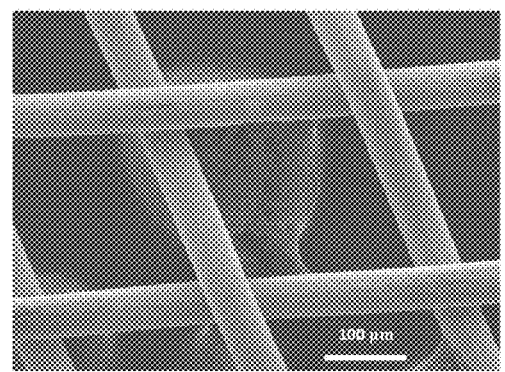
Figure 4B:
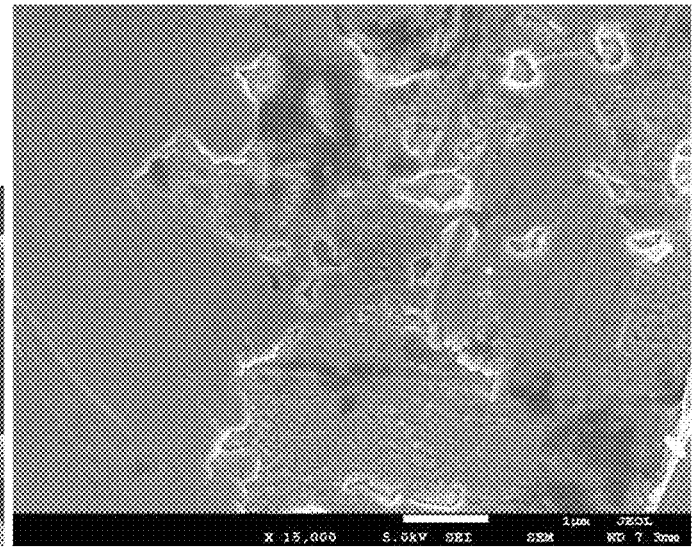
Figure 4C:
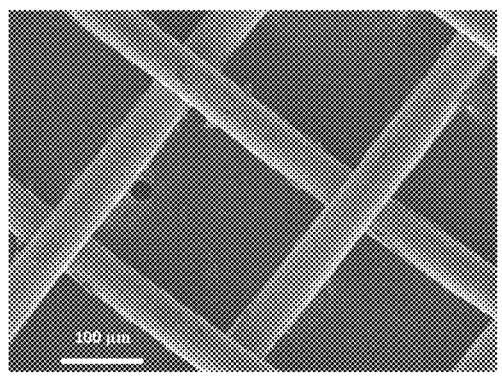
Figure 4D:
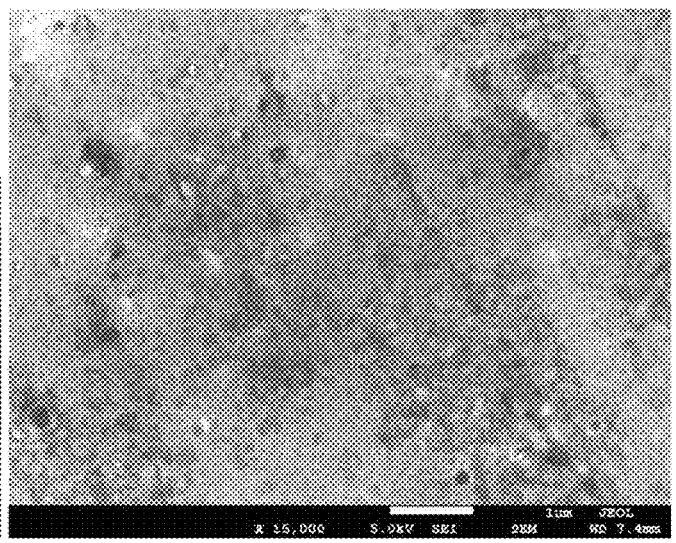
Figure 4E:
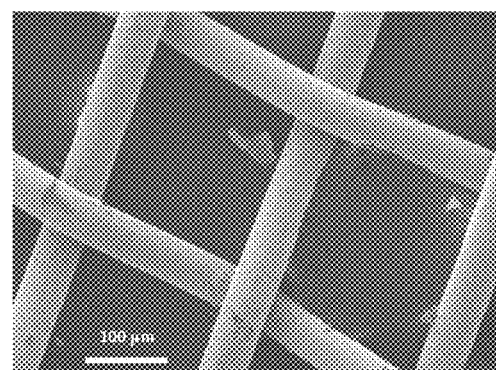
Figure 4F:
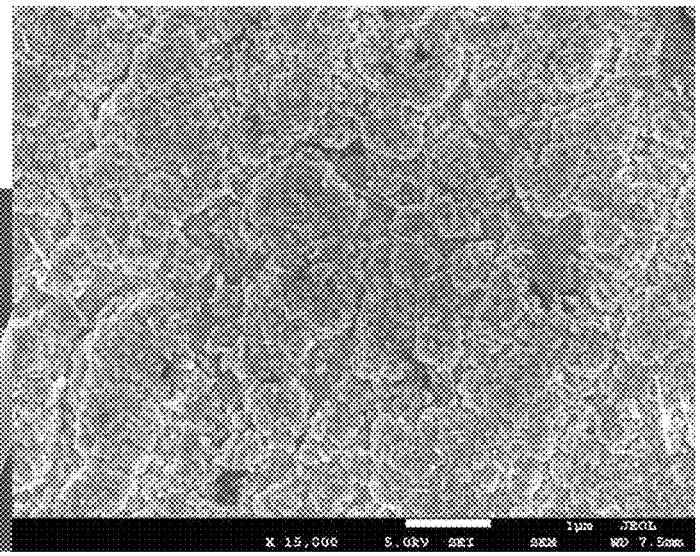

To verify the chemical compositions and the oxidation states of the Cu mesh surface, XPS measurements were carried out. Charging effects were corrected by assigning the C1s of all survey spectra (see FIG. 3A) to the value of 284.6 eV [J. Y. Park, et. al., Bull. Kor. Chem. Soc., 32, 9, 2011, 3395-3399]. By analyzing the Cu $2p_{3/2}$ core peak, illustrated in FIGS. 3B-3C, it is clear that it consists of two peaks located at 932.4 eV and 933.6 eV, which are assigned to $Cu^+$ ions and $Cu^{2+}$ respectively [J. Ghijsen, et. al., Phys. Rev. B, 38, 16, 1988, 11322-11330.]. If the ratios of $Cu^+/Cu^{2+}$ are compared for the three samples M200, M300 and M400, which are summarized in Table 1, it is clear that both $Cu^+$ and $Cu^{2+}$ are present in all samples and the ratios of samples M200 and M300 are comparable. But taking into account the intensity of Cu 2p peaks, shown in FIG. 3B, one can conclude that sample (M300) has the largest percentage of $Cu^+$ sites, characteristic of the $Cu_2O$ phase. For samples annealed at 400° C., the evolving of the peak located at 933.6 eV, in addition to the shake-up satellite peaks located at 940.6 and 943.1 eV, indicate the predominance of CuO phase [L. Martin, et. al., J. Phys. Chem. C, 117, 9, 2013, 4421-4430]. The inability to detect this phase by XRD in samples annealed at 200° C. and 300° C. implies that it must exist as a very thin layer covering the surface. It is worth mentioning here that binding energies of $Cu^0$ and $Cu^+$ are almost indistinguishable by XPS because of their superimposition on one another (see J. Y. Park, et. al.); nonetheless, since Cu mesh is used as a substrate, $Cu^0$ sites are presumed to be existent. The coexistence of Cu and $Cu_2O$ in these samples was affirmed by the XRD patterns shown in FIG. 2A and an HRTEM images discussed below. Moreover, Auger energy level could be a useful tool to identify the specific oxidation state. As it illustrated in FIG. 3D, the peak that appears at 568.1 eV is attributed to metallic copper (see L. Martin, et. al.) which further confirms the presence of $Cu^0$. These findings indicate that all samples consist of heterogeneous mixed oxidation state $Cu_xO$ deposited on a Cu framework, or what is reasonable to abbreviate as $Cu_xO@Cu$. FIG. 3E shows the binding energy of O1s peaks for samples annealed at 200° C., 300° C. and 400° C. Two oxygen components are detected, namely the O—Cu at 529.4 eV and the adsorbed oxygen at 532 eV (abbreviated O-surface) (see J. Y. Park, et. al.). The ratios of $O^{2-}$/O-surface, listed in Table 1, further confirm the presence of $Cu_xO$ on the surface of the Cu mesh.

TABLE 1

Relative percentages of ($Cu^+/Cu^{2+}$) and ($O^{2-}$/O-surf) for each of $Cu_xO@Cu$ samples as determined by XPS.

|  | $Cu_xO@Cu$ M200 | $Cu_xO@Cu$ M300 | $Cu_xO@Cu$ M400 |
|---|---|---|---|
| $Cu^+$ | 43.1% | 40.7% | 28.1% |
| $Cu^{2+}$ | 56.9% | 59.3% | 71.9% |
| $Cu^+/Cu^{2+}$ | 0.76 | 0.69 | 0.39 |
| $O^{2-}$ | 11.5% | 39.3% | 28.8% |
| O-surf | 88.5% | 60.7% | 71.2% |
| $O^{2-}$/O-surf | 0.13 | 0.65 | 0.40 |

The scanning electron microscopy (SEM) images for pure copper mesh, $Cu_xO@Cu$ M200, $Cu_xO@Cu$ M300 and $Cu_xO@Cu$ M400 are presented in FIGS. 4A-4J. Compared to the surface of pure copper mesh shown in FIGS. 4A-4B, all meshes are found to be coated with a thin and wrinkled layer (see FIGS. 4C-4H), while the diameter of the mesh holes shown in the insets reveals no noticeable changes. More importantly, the size of particles accumulated on the surface of the mesh appeared to increase by increasing the annealing temperature. This can be further verified by the magnified view (see FIGS. 4I-4J), with $Cu_xO@Cu$ M300 showing relatively more grooves, and hence a larger surface area.

To give further insight into the microstructure of the sample $Cu_xO@Cu$ M300, TEM characterization was carried out. FIG. 5A shows the HRTEM image of a fragment of the mesh surface, shown in FIG. 5B. A corresponding selected area electron diffraction (SAED) pattern of the area marked with a dashed rectangle is illustrated in FIG. 5C. The crystal lattices were calculated to be 2.09 Å, 2.13 Å and 3.01 Å, corresponding to Cu (111), $Cu_2O$ (200) and $Cu_2O$ (110), respectively.

It has been reported that the rate of copper oxidation under humid conditions can be accelerated significantly in presence of alkali solutions [Y. Liu, et. al., Journal of Materials Chemistry, 16, 2, 2006, 192-198 and J. Y. Zheng, et. al., RSC Advances, 4, 36, 2014, 18616-18620]. In such a process $Cu^{2+}$ ions are released constantly from the Cu substance into the alkali solutions whereas the naturally dissolved $O_2$ is reduced. Spinach is known as one of the alkaline powerhouse that has pH level of 6.6-7.2 when cooked.

The growth mechanism of $Cu_2O$ from Cu particles in the alkaline spinach solution is presumed to proceed in the same manner described in J. Y. Zheng, et. al.

The $O_2$ in air is dissolved in the solution and then adsorbed on the surface of Cu particles. This $O_2$ adsorption will oxidize the Cu atoms to $Cu^{2+}$ ions as the following:

$$2Cu+O_2+2H_2O \rightarrow 2Cu^{2+}+4OH^- \quad (3)$$

Through a very short time the $Cu^{2+}$ ions can be reduced to $Cu^+$ ions by neighboring Cu atoms according to the reaction;

$$Cu^{2+}+Cu \rightarrow 2Cu^+ \quad (4)$$

Consequently, $Cu^+$ ions will react with $OH^-$ in the solution to form $Cu_2O$ nucleation sites following this reaction;

$$2Cu^++2OH^- \rightarrow Cu_2O+H_2O \quad (5)$$

The photocatalytic activity of Cu M, $Cu_xO@Cu$ M200, $Cu_xO@Cu$ M300, and $Cu_xO@Cu$ M400 were examined under natural outdoor sunlight. Among all samples, only $Cu_xO@Cu$ M200 and $Cu_xO@Cu$ M300 showed reasonable degradation percentages of 36% and 52%, respectively, after 120 min of irradiation. The photocatalytic activity of Cu M and $Cu_xO@Cu$ M400 were almost negligible as they showed degradation values around 10-12% (see FIG. 6). Such divergence in degradation efficiency could be related to the morphology of the samples, where $Cu_xO@Cu$ M300, with its largest surface area and porous structure, exhibited the highest rate of MB degradation. Another factor that could enhance the degradation rate of sample $Cu_xO@Cu$ M300 is the abundance of $Cu^+$ active sites (i.e. $Cu_2O$ phase) on its surface, as indorsed by the XPS and TEM measurements. Such condition would boost the sample's absorption of visible light and hence improve its photocatalytic efficiency. Nonetheless, it is worth emphasizing that although we believe that $Cu^+$ are the catalytic active sites, the coexistence of the oxidation state $Cu^{2+}$ is required to construct the catalytic heterojunction which would enhance the separation of photo-generated electron-hole pairs, as illustrated in FIG. 7. Specifically, electrons from $Cu_2O$ transfer to the CB of CuO, whereas the photo-generated holes move from CuO to the VB of $Cu_2O$. Moreover, the Cu mesh, with its excellent conductivity, acts as a good electron acceptor, accepting the photoexcited electrons from CB of $Cu_2O$ [H. Li, et. al., Appl. Catal., B, 207, 2017, 134-142.], thus enriching the photocatalytic activity. $Cu_2O$ and CuO are both semiconductor with direct band gaps of 2.2 eV and 1.7 eV, respectively [B. Meyer, et. al., Phys. Status Solidi B, 249, 8, 2012, 1487-1509]. In a photocatalytic reaction, illustrated in FIG. 7, $Cu_2O$ will absorb the incident sunlight energy if it is equal or higher than its band. This will cause an excitation of electron from valence band (VB) to the conduction band (CB) and create an (electron-hole) pairs. As a result, a vacancy ($h^+$) will be formed at valence band while an electron (e) will be excited to conduction band. If the separation time was long enough, holes will react with water to form hydroxyl radicals (.OH), and electrons will react with oxygen to form a series of oxidizing species like superoxide anion, hydrogen peroxide and hydroxyl radicals. The coexistence of both CuO and $Cu_2O$ in the catalyst composites will increase the separation efficiency of photo-generated electron-hole pairs. Specifically, electrons from $Cu_2O$ transfer to the CB of CuO, whereas the photo-generated holes move from CuO to the VB of $Cu_2O$. Moreover, the Cu mesh with its excellent conductivity acts as good electron acceptors, accepting the photo-excited electrons from CB of $Cu_2O$, and hence enhance the photocatalytic activity.

In order to enhance the charge separation in sample $Cu_xO@Cu$ M300 even more, 0.9 mL of $H_2O_2$ (9%), known for its efficiency as a strong electron scavenger, was added. It has been reported that $H_2O_2$ could accelerate the degradation rate of MB in the presence of CuO nanostructures [L. Xu, et. al., J. Alloys Compd., 695, 2017, 263-269; 0. Baghriche, et. al., Catal. Today, 284, 2017, 77-83; and L. Xu, et. al., Appl. Surf. Sci., 258, 2012, 4934-4938]. With the aim of investigating the synergy effect between $H_2O_2$ and $Cu_xO@Cu$ M300 composites, four samples with different catalysts were examined under the same conditions; S1 ($Cu_xO@Cu$ M300 only), S2 ($Cu_xO@Cu$ M300+$H_2O_2$), S3 ($H_2O_2$ only), while S4 was kept without any catalyst to verify the effect of sunlight on the MB degradation. The photocatalytic activities of the four samples were inspected under a low sunlight intensity of 7 $mW/cm^2$ as shown in FIGS. 8A-8B. FIG. 9A compares the results of the four samples where sample S2, unlike the others, demonstrated a full degradation of MB within 60 min. During the same time interval, samples treated either by $Cu_xO@Cu$ M300 (S1) or $H_2O_2$ alone (S3) showed 45% and 86.7% of MB degradation, respectively. It is worth mentioning that the effect of bare sunlight on MB degradation, as in S4, can scarcely be noticed. The recycling capability of S2 was checked and it was found that, up to the 3rd cycle, the degradation efficiency remained as high as 98%. FIG. 9B represents the photocatalytic activity of S2 for three successive cycles, with the corresponding image of the MB solutions after being mediated.

Figure 9C:
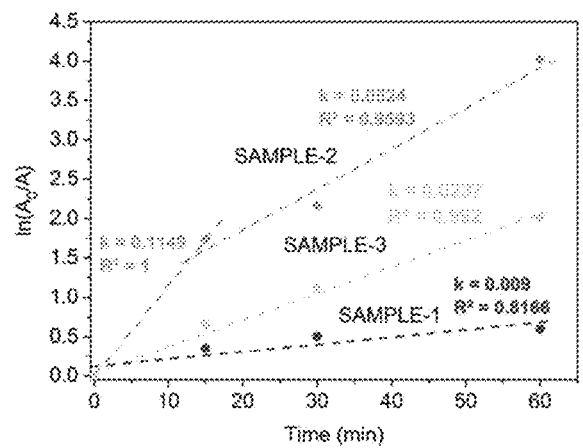
Figure 9D:
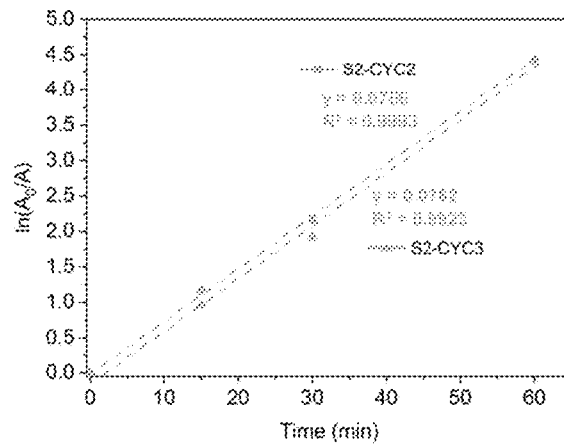

The degradation rates as a function of the irradiation time for all samples are plotted in FIG. 9C. The first cycle of S2 did not proceed with a persistent rate, as it started with a very high speed of k=115 m $min^{-1}$ during the first 15 min, then it was seen to slow down to k=52.4 m $min^{-1}$. Such an observation could be attributed to the well-known scavenging of the hydroxyl radical (.OH) in the solution (See H. Li, et. al.). In contrast, the second and the third cycles of S2, shown in FIG. 9D, showed excellent linear kinetic rates of degradation measured as k=75.6 m $min^{-1}$, and k=76.2 m $min^{-1}$ respectively. Although the rate of S1 (without the synergy of $H_2O_2$) was not as superb as S2, it is still comparable to the rate obtained by H. Li et. al. using their Cu mesh that has been subject for thermal annealing at 500° C. for 3 h. Compared to other reported $Cu_xO@Cu$ composites (see Table 2), the $Cu_xO@Cu$ M300 catalysts disclosed here demonstrated excellent photocatalytic degradation of MB with high kinetic rate and a remarkable capability for recycling, despite both the facile method they were fabricated with (see Table 3), and the low sunlight intensity they were irradiated by [O. Baghriche, et. al., Catal. Today, 284, 2017, 77-83; H. Li, et. al., Appl. Catal. B, 207, 2017, 134-142; C. Zhou, et. al., Chem. Eng. J., 307, 2017, 803-811; Y. Lu, et. al., ACS Appl. Mater. Interfaces, 7, 18, 2015, 9682-9690; Al-Jawhari, H., et. al., Materials Letters, 254, 2019, 233-236; M. Kamazani, et. al., Adv. Powder Technol., 28, 2017, 2078-2086; L. Xu, et. al., Journal of Alloys and Compounds, 695, 2017, 263-269; D. Jiang, et. al., Applied Catalysis B, 211, 2017, 199-204; J. Y. Zheng, et. al., RSC Advances, 4, 36, 2014, 18616-18620; and J. Lv, et. al., Sensors and Actuators B: Chemical, 248, 2017, 630-638].

Besides the photocatalytic performance, the effect of $Cu_xO@Cu$ M300 on neutralizing the pH of the treated water was investigated (Table 4). Compared to the pH=6.5 of MB solution, the water treated with $H_2O_2$ alone (S3) showed a pH=6.3, while the sample treated with both $Cu_xO@Cu$ M300 and $H_2O_2$ (S2) exhibited more alkaline water with pH=7.5. These results demonstrate that although $H_2O_2$ alone cannot manipulate the MB acidity, the coexistence of $Cu_xO@Cu$ M300 could improve its pH to a drinkable level. A similar observation was reported by Baghriche, et. al., as they noticed that during the MB degradation by $H_2O_2$, the pH of the MB dye solution decreased from 5.4 to 4.2. They ascribed this to (.OH), and not ($O^2$), being the predominating species in the solution during the decomposition of $H_2O_2$. Whereas, when a metal oxide ($Cu_xO$, in this case) is involved, the superoxides ($O^{2-}$) are often the prevailing species, hence, the pH is expected to increase. Enhancing the degradation rate of MB in the presence of Hydrogen peroxide ($H_2O_2$) has been reported widely [L. Xu, et. al., Appl. Surf. Sci., 331, 2015, 449-454; L. Xu, et. al., Journal of Alloys and Compounds, 695, 2017, 263-269; and L. Xu, et. al., Appl. Surf. Sci., 258, 2012, 4934-4938]. This behavior can be explained by the dual function of $H_2O_2$ to scavenge electrons during the photocatalytic process. First, $H_2O_2$ constrains electron-hole recombination by accepting the photogenerated electrons from C.B of semiconductor ($Cu_xO$ in this case) and helps charge separation and so enhances the photo-degradation. Second, $H_2O_2$ can be decomposed to hydroxyl radicals (.OH) through UV from sunlight, according to the relation:

$$H_2O_2 + h\nu \rightarrow 2.OH \quad (6)$$

It is well known that (.OH) radical is a powerful oxidizing agent with a redox potential of 2.8 V, which can degrade most pollutants [Parsons, S., Advanced oxidation processes for water and wastewater treatment. 2004, London: IWA Publishing]. However, their increase will reduce the pH of the solution.

On the other hand, when a metal oxide (such as $Cu_xO$) is involved, the photogenerated electrons to conduction band ($cbe^-$) could either react directly with the $O_2$ forming $O_2^-$ or reduce the $Cu^{2+}$ to $Cu^+$ as noted in the following equations [O. Baghriche, et. al., Catalysis Today, 284, 2017, 77-83]:

$$CuO(cbe^-) + O_2 \rightarrow CuO + O_2^- \quad (7)$$

$$CuO(cbe^-) \rightarrow CuO(Cu^+) \quad (8)$$

$$CuO(Cu^+) + O_2 \rightarrow CuO(Cu^{2+}) + O_2^- \quad (9)$$

Where the superoxide ($O^{2-}$) is the prevailing species, hence, one would expect the pH to be increased.

TABLE 2

| | | | | | | | | | | |
|---|---|---|---|---|---|---|---|---|---|---|
| Catalyst | Form | Preparation Temp/Time | Dye | Light | Intensity (mW/cm²) | Degrad. % | Rate m min⁻¹ | Time | Year | Ref. |
| $Cu_xO@Cu$ + $H_2O_2$ | Mesh | Green Synthesis 300° C./1 hr | MB | Natural Sunlight | 7 | 100% | 63.2 | 60 | 2021 | This work |
| $Cu_xO@Cu$ | Mesh | Green Synthesis 300° C./1 hr | MB | Natural Sunlight | 7 | 52% | 9 | 120 | 2021 | This work |
| $Cu/Cu_2O$ | Film | Green Synthesis 200° C./0.5 hr | MB | Natural Sunlight | 3 | 97.7% | 20 | 180 | 2019 | H. Al-Jawhari, et. al. |
| $Cu/Cu_2O/CuO$ | Mesh | Thermal Oxidation 500° C./9 hr | RhB | Visible (lamp | 13.8 | 72% | 12 | 120 | 2017 | H. Li, et. al. |
| $Cu/CuO$ + $H_2O_2$ | Film | Sputteret @ RT + Chemical Reduction | MB | Visible (lamp) | 50 | 100% | 40 | 120 | 2017 | O. Baghriche et. al. |
| $Cu/Cu_2O$ | Powder | Green Synthesis 400° C./2 hr | MB | Visible (lamp) | 50 | 99% | — | 150 | 2017 | M. Kamazani, et. al. |
| $Cu-CuO$ + $H_2O_2$ | Powder | Chemical Microreactor | MB | UV | — | 98.5% | 109 | 50 | 2017 | L. Xu, et. al. |
| $CuO/Cu_2O$ NWs | Powder | Chemical method 40° C./6 hr | MO | Visible (lamp | 150 | 100% | — | 30 | 2017 | D. Jiang, et. al. |

TABLE 3

Different oxidation approaches used in other methods.

| Substrate | Oxidation Method | Temp | Time | Ref. |
|---|---|---|---|---|
| Cu foil + Cu film | 4M NaOH (v. concentrated) | 80° C. | 1 hr @ 80° C. + 4 days @ RT | J.Y. Zheng, et. al. |
| Cu foil | $H_2O_2$ | 180° C. | 12 hr | J. Lv, et. al. |
| Cu mesh | Thermal | 500° C. | 9 hr | H. Li, et. al. |
| Cu mesh | Spinach Extract + Thermal | 90° C. + 300° C. | 1 hr @ 90° C. + 1 hr @ 300° C. | This work |

TABLE 4

| Sample | pH |
|---|---|
| pH values of MB solutions before and after treatment | |
| Methylene Blue solution - Pristine | 6.5 |
| Methylene Blue solution - treated with $H_2O$ | 6.2 |
| Methylene Blue solution - treated with Sample S3 | 6.3 |
| Methylene Blue solution - treated with Sample S2 | 7.5 |

The invention claimed is:

1. A method of forming a nanomaterial catalyst mesh comprising a copper mesh support and a nanoparticle layer comprising CuO and $Cu_2O$ disposed on the copper mesh support, the method comprising:
   treating the copper mesh support with a spinach leaf extract to form a treated mesh; and
   annealing the treated mesh at 210 to 500° C. to form the nanomaterial catalyst mesh, wherein the nanoparticle layer comprises $Cu_2O$ nanoparticles having a mean particle size of 10 to 500 nm.

2. The method of claim 1, wherein the copper mesh support has a wire diameter of 25 to 75 μm and an opening size of 100 to 300 μm.

3. The method of claim 1, wherein the spinach leaf extract is an aqueous spinach leaf extract prepared by:
   boiling spinach leaves in water in an amount of 5 to 35 g spinach leaves per 100 mL of water to form a spinach leaf suspension; and
   filtering the spinach leaf suspension to form the aqueous spinach leaf extract.

4. The method of claim 1, wherein the treating is performed at 80 to 100° C. for 15 to 120 minutes and the annealing is performed for 15 to 120 minutes.

5. The method of claim 1, wherein the nanoparticle layer has a $Cu^I:Cu^{2I}$ ratio of 0.25:1 to 1:1 by XPS.

6. The method of claim 1, wherein the $Cu_2O$ nanoparticles are crystalline by PXRD and/or electron diffraction.

7. The method of claim 6, wherein the nanoparticle layer further comprises crystalline CuO by PXRD and/or electron diffraction.

8. The method of claim 1, wherein the nanoparticle layer comprising CuO and $Cu_2O$ comprises core-shell nanoparticles comprising a core of $Cu_2O$ and a shell of CuO.

9. A nanomaterial catalyst mesh, comprising a copper mesh support and a nanoparticle layer comprising CuO and $Cu_2O$ disposed on the copper mesh support, wherein
   the nanomaterial catalyst mesh has a wire diameter of 25 to 75 μm and an opening size of 100 to 300 μm; and
   the nanoparticle layer comprises $Cu_2O$ nanoparticles having a mean particle size of 10 to 500 nm.

10. The nanomaterial catalyst mesh of claim 9, wherein the nanoparticle layer comprising CuO and $Cu_2O$ has a $Cu^+:Cu^{2+}$ ratio of 0.25:1 to 1:1.

11. The nanomaterial catalyst mesh of claim 9, wherein $Cu_2O$ nanoparticles are crystalline by PXRD and/or electron diffraction.

12. The nanomaterial catalyst mesh of claim 11, wherein the nanoparticle layer further comprises crystalline CuO by PXRD and/or electron diffraction.

13. The nanomaterial catalyst mesh of claim 9, wherein the nanoparticle layer comprising CuO and $Cu_2O$ comprises core-shell nanoparticles comprising a core of $Cu_2O$ and a shell of CuO.

14. A method of photodegrading an organic pollutant, the method comprising:
   contacting a photodegradation solution comprising the organic pollutant and hydrogen peroxide with the nanomaterial catalyst mesh of claim 9 to form a catalytic mixture; and
   irradiating the catalytic mixture with visible light.

15. The method of claim 14, wherein the irradiating is performed at an irradiation intensity of 4 to 10 $mW/cm^2$.

16. The method of claim 14, wherein the organic pollutant is a dye.

17. The method of claim 16, wherein the photodegradation solution has a weight ratio of dye to hydrogen peroxide of 2:1 to 5:1.

18. The method of claim 16, wherein the dye is methylene blue and the method degrades greater than 95% of an initial amount of methylene blue in 30 to 90 minutes.

* * * * *

UNITED STATES PATENT AND TRADEMARK OFFICE
CERTIFICATE OF CORRECTION

| | |
|---|---|
| PATENT NO. | : 11,376,570 B1 |
| APPLICATION NO. | : 17/381266 |
| DATED | : July 5, 2022 |
| INVENTOR(S) | : Hala Al-Jawhari et al. |

It is certified that error appears in the above-identified patent and that said Letters Patent is hereby corrected as shown below:

In the Specification

Column 1, Line 4, insert the following:
--The investigators extend their appreciation to the Deputyship for Research & Innovation, Ministry of Education in Saudi Arabia for funding this research work through the project number "057-2021" and to King Abdulaziz University, DSR, Jeddah, Saudi Arabia.--

Signed and Sealed this
Twentieth Day of January, 2026

John A. Squires
*Director of the United States Patent and Trademark Office*